(12) United States Patent
Akahori

(10) Patent No.: US 6,908,061 B2
(45) Date of Patent: *Jun. 21, 2005

(54) AIRSHIP SYSTEM

(75) Inventor: Yutaka Akahori, Yamagata (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/877,082

(22) Filed: Jun. 25, 2004

(65) Prior Publication Data

US 2004/0232285 A1 Nov. 25, 2004

Related U.S. Application Data

(63) Continuation of application No. 10/189,796, filed on Jul. 3, 2002, now Pat. No. 6,857,601.

(30) Foreign Application Priority Data

Jul. 6, 2001 (JP) ........................................ 2001-206677

(51) Int. Cl.[7] ................................................ B64B 1/00
(52) U.S. Cl. ......................... 244/96; 244/30; 244/76 R; 244/190; 342/463
(58) Field of Search ............................. 244/30, 29, 96, 244/31, 76 R, 189, 190; 342/464, 463, 450

(56) References Cited

U.S. PATENT DOCUMENTS

| 3,864,662 A | 2/1975 | David et al. |
| 4,231,093 A | 10/1980 | LaVance et al. |
| 4,686,474 A | 8/1987 | Olsen et al. |
| 5,032,845 A | 7/1991 | Velasco |
| 5,716,032 A | 2/1998 | McIngvale |
| 5,906,335 A | 5/1999 | Thompson |
| 6,483,461 B1 | 11/2002 | Matheney et al. |
| 6,553,299 B1 | 4/2003 | Keller et al. |

FOREIGN PATENT DOCUMENTS

| JP | 6-247393 | 6/1994 |
| JP | 2000-203491 | 7/2000 |

OTHER PUBLICATIONS

RQ–1 Predator Unmanned Aerial Vehicle Fact Sheet, Predator Systems Circa 1997, http://www.af.mil/news/factsheets/RQ_1_Predator_Unmanned_Aerial.html.
General Atomics RQ–1A Predator, Predator Systems Circa 1997, Janes Unmanned Aerial Vehicles and Targets 15.
Raytheon GHGS, Global Hawk Systems Circa 1998, Janes Unmanned Aerial Vehicles and Targets 19.
Unmanned Systems–Global Hawk Fact Sheet, Global Hawk Systems Circa 1998, http://www.northgrum.com/tech_cd/is/is_unmanned_hawk_fact.html.
Northrop Grumman RQ–4A Global Hawk, Global Hawk Systems Circa 1998, Janes Unmanned Aerial Vehicles and Targets 20.

Primary Examiner—Peter M. Poon
Assistant Examiner—Timothy D. Collins
(74) Attorney, Agent, or Firm—Harness, Dickey & Pierce, P.L.C.

(57) ABSTRACT

An airship system according to the invention has an airship (110), a base station (120), and at least three measurement points. The airship (110) emits ultrasonic waves upon receiving an instruction from the base station (120). Measurement point units (S1–S3) receive the ultrasonic waves, and thereby measure distances from the airship (110) to the respective measurement points. An MPU that is incorporated in the base station (120) calculates a position of the airship (110). The base station (120) controls a route of the airship (110) based on the calculated position by sending a flight instruction to the airship (110). In this manner, an airship system can be provided that makes it unnecessary for an operator to pilot the airship and that can reduce the load weight and the power consumption of the airship.

23 Claims, 23 Drawing Sheets

AIRSHIP SYSTEM

CROSS-REFERENCE TO RELATED APPLICATION

This application is a continuation of U.S. Ser. No. 10/189,796 filed on Jul. 3, 2002 now U.S. Pat. No. 6,851,601, claiming priority to 2001-206677, filed Jul. 6, 2001, all of which are hereby incorporated by reference.

TECHNICAL FIELD

The present invention relates to, in particular, to a flight control technique using communication between an aircraft and a base station.

BACKGROUND ART

One type of aircraft or airship flies using a proper propelling means thereof while generating a lifting force using a ship-floating gas. Airships are classified into large ones capable of accommodating persons and crewless ones. For crewless airships, airship systems are known in which a movable radio station is prepared on the ground and the airship is piloted by manipulations of an operator in the movable radio station. In this case, the operator controls the moving direction of the airship by sending a navigation instruction to the airship by radio and operating the propelling means of the airship accordingly.

On the other hand, Japanese Patent Laid-Open No. 6-247393 discloses an airship system in which the airship is controlled according to a navigation program input to a computer in advance. In this airship system, an airship is provided with a controller including a CPU and the controller controls a route of the airship according to the navigation program. When sensors that are provided at top and bottom positions, front and rear positions, and left and right positions of the air ship detect an obstacle, an operation to avoid the obstacle is performed.

However, in the above-described conventional airship systems with piloting by an operator, it is necessary that the operator pilot the airship all the time. Therefore, an accident may occur unless the operator has a superior piloting technique. There is another problem that those airship systems are not suitable for long-time flights.

On the other hand, the method disclosed in the above publication requires no operators and enables long-time flights. However, since the airship itself is mounted with a complex controller and a lot of sensors, the load weight is heavy and much power is consumed: the airship needs to be increased in size to obtain a sufficient lifting force. Therefore, this system has a problem that it cannot be used for controlling a small airship.

The present invention has been made to solve the above problems, and an object of the invention is therefore to provide an airship system capable of dispensing with piloting by an operator and reducing the load weight and the power consumption of devices that are mounted on the airship.

DISCLOSURE OF THE INVENTION

To attain the above object, the invention provides an aircraft or airship system comprising an airship having communication means and propelling means that operates according to instructions that are given; a base station having control means and communication means capable of communicating with the airship; and position measuring means for measuring a position of the airship, wherein the control means comprises instruction forming means for forming, based on the position of the airship that is measured by the position measuring means, the instructions including a flight instruction for controlling a route of the airship, and causes the communication means to send the instructions to the airship.

In this airship system, since the airship is controlled according to instructions from the base station, the necessity for the airship itself to be equipped with a complex control system is low. This makes it possible to reduce the weight and the power consumption of the airship.

In the invention, it is preferable that the position measuring means measure positional relationships between the airship and a plurality of measurement points. Measuring positional relationships between the airship and the plurality of measurement points makes it possible to measure a position of the airship easily and correctly.

It is preferable that the position measuring means comprise distance measuring means for measuring distances between the airship and the measurement points. The inclusion of the distance measuring means for measuring distances between the airship and the measurement points makes it possible to determine a position of the airship quickly and easily with a simple measuring means. In particular, where the measurement points are located at three or more locations, distances between the airship and three measurement points can be measured. Therefore, spatial coordinates (i.e., three-dimensional position coordinates) of the airship can be determined completely based on a coordinate system that uses at least the positions of measurement points as references.

In the invention, it is preferable that the position measuring means determine a position of the airship by measuring distances between the airship and three measurement points with the distance measuring means. In this case, a position of the airship can be determined merely by measuring distances between the airship and three measurement points with the distance measuring means. Therefore, the airship position measurement can be performed very easily.

It is preferable that the distance measuring means comprise a wave generator or generators provided in the airship or at the measurement points for generating waves and a wave detector or detectors provided at the measurement points or in the airship for detecting the waves emitted from the wave generator or generators, and calculate distances between the airship and the measurement points based on times from generation of the waves by the wave generator or generators to arrival of the waves at the wave detector or detectors. Examples of the waves are sound waves such as ultrasonic waves and electromagnetic waves such as light. Where the wave detectors are provided at the respective measurement points, the system may be so configured that the positional relationships between the wave detectors can be changed freely or the wave detectors may be arranged in advance so as to have prescribed positional relationships. Specific examples are as follows: the wave generator is provided in the airship and the wave detectors are provided at the respective measurement points, and the wave generators are provided at the respective measurement points and the wave detector is provided in the airship.

It is preferable that the airship system further comprise measurement point positional relationships determining means for determining positional relationships between the measurement points. Providing the measurement point positional relationships determining means makes it possible to perform the airship position measurement using measurement points as references by determining positional relationships between the measurement points even if the measurement points are located at arbitrary locations.

It is preferable that the measurement point positional relationships determining means measure distances between the measurement points. This makes it possible to completely determine relative position coordinates of the measurement points, that is, position coordinates in a coordinate system that uses the positions of measurement points as references.

In this case, it is preferable that the measurement point positional relationships determining means comprise wave generators that are provided at least two of three measurement points and a wave detector provided at another measurement point for detecting waves emitted from the wave generators, and calculate distances between the measurement points based on times from emission of waves from the wave generators to arrival of the waves at the wave detector.

In the invention, it is preferable that the airship system further comprise additional measurement point position determining means for determining positional relationships between an additional measurement point and existing measurement points when the additional measurement point is added. This makes it possible to measure a position of the airship by also using a new measurement point that is added when necessary and determining positional relationships between the new measurement point and existing measurement points. Increasing the number of measurement points in this manner makes it possible to shorten the distances between measurement points for the airship position measurement, which in turn makes it possible to reduce the energy that is necessary to, for example, generate waves for the airship position measurement and thus to save energy. It also becomes possible to expand an airship position measurable area. Further, increasing the number of measurement points when necessary makes it possible to easily adapt to a purpose of using an airship, a function of a system, and a place of use. Therefore, it becomes possible to construct a system capable of accommodating various situations while minimizing its manufacturing cost.

It is preferable that the additional measurement point position determining means measure distances between the additional measurement point and the existing measurement points. Measuring distances between the additional measurement point and the existing measurement points with the additional measurement point position determining means makes it possible to determine the position of the additional measurement point easily. To determine three-dimensional position coordinates of the additional measurement point completely, it is necessary to determine distances between the additional measurement point and three existing measurement points in the case where the measurement points are arranged at arbitrary locations, or to determine distances between the additional measurement point and two existing measurement points in the case where all the measurement points are arranged in the same plane.

In the invention, it is preferable that the airship system further comprise route changing means for reversing a traveling direction of the airship or causing the airship to descend when the position measuring means becomes unable to detect a position of the airship. The route changing means makes it possible to prevent lowering of the accuracy of the position control on the airship. In particular, it becomes possible to keep the airship within a position-measurable area by reversing the traveling direction of the airship.

It is preferable that the airship system further comprise route correcting means for correcting the route of the airship before the airship goes out of a position-measurable area where airship position measurement by the position measuring means is possible. The route correcting means makes it possible to control the airship so that it stays in the position-measurable area by correcting the route of the airship.

It is preferable that the airship comprise obstacle detecting means for detecting an obstacle located ahead of the airship in a traveling direction, and that the airship system further comprise obstacle avoiding means for controlling the propelling means so that the route of the airship is changed and the airship will thereby avoid an obstacle when the obstacle detecting means has detected the obstacle.

The obstacle avoiding means may be provided in the airship. In this case, the airship can avoid an obstacle by itself. It is not necessary to send, to the base station, information to the effect that the obstacle has been detected and to receive a related instruction from the base station. This makes it possible to avoid the obstacle quickly.

On the other hand, it is preferable that the obstacle avoiding means be provided in the base station, that the obstacle detecting means send an obstacle detection signal to the base station when detecting the obstacle, and that the obstacle avoiding means cause the instruction forming means to form a flight instruction for changing the route of the airship and thereby avoiding the obstacle based on the obstacle detection signal. In this case, it is not necessary to provide the obstacle avoiding means in the airship, which makes it possible to reduce the weight and the size of the airship.

It is preferable that the airship system further comprise a charging base for supplying power to the airship.

In this case, it is desirable that the airship be so configured as to send a return request signal to the base station when power has gone short, that upon receiving the return request signal, the control means forms a return instruction and sends the return instruction to the airship, and that the propelling means operate so that the airship will return to the charging base.

It is preferable that the airship system further comprise a gas supply base for supplying a ship-floating gas to the airship.

In this case, it is desirable that the airship be so configured as to send a return request signal to the base station when a ship-floating gas has gone short, that upon receiving the return request signal, the control means cause forms a return instruction and sends the return instruction to the airship, and that the propelling means operate so that the airship will return to the gas supply base.

It is preferable that the charging base and the gas supply base be the same base. Further, it is desirable that these bases be integral with the base station.

In the invention, it is preferable that the airship system further comprise load weight adjusting means capable of reducing a load weight of the airship by releasing a gas. Capable of reducing the load weight by releasing a gas, the load weight adjusting means is free of problems that may occur in the case of releasing a liquid or a solid, such as contaminating the environment and pouring the liquid or solid on a person. With a low probability of affecting the environment, this configuration can be employed more easily in various situations. The airship system may be so configured that reaction from a released gas is used as a propelling force for moving the airship or changing its posture.

It is preferable that the load weight adjusting means release the gas so as to compensate for at least part of a loss with time of a ship-floating gas of the airship. This makes it possible to elongate the flight duration by lowering the rate of height reduction due to the loss with time of the ship-floating gas of the airship. Examples of the gas are air, oxygen, nitrogen, and other inert gases because they are harmless to the human body.

It is preferable that the load weight adjusting means comprise a container for containing a compressed gas and a control valve for releasing the gas from the container with control. In this case, the load weight can be adjusted in accordance with a situation because the control valve can control the rate of release of the gas from the container. In particular, the control valve may be of such a type as to be able to control the gas release rate by an opening/closing operation. It is desirable that the control valve be able to control the flow rate of gas release.

It is preferable that the load weight adjusting means comprise a container for containing a liquid and a control valve for evaporating the liquid in the container with control. The liquid that is used to adjust the load weight can be contained more compactly than in the case of using a compressed gas. This makes it possible to adjust the load weight in a wider range and elongate the flight duration of the airship. The control valve may be of such a type as to perform an opening/closing operation. It is desirable that the control valve be able to control the opening area. It is preferable that the liquid evaporate easily and be substantially harmless to the human body even after evaporation. Examples of the liquid are water and alcohol.

It is preferable that the load weight adjusting means comprise a container for containing a solid and a control valve for sublimating the solid in the container with control. The solid that is used to adjust the load weight can be contained more compactly than in the case of using a compressed gas. This makes it possible to adjust the load weight in a wider range and elongate the flight duration of the airship. The control valve may be of such a type as to perform an opening/closing operation. It is desirable that the control valve be able to control the opening area. It is preferable that the solid sublimate easily and be substantially harmless to the human body even after sublimation. Examples of the solid are naphthalene, p-dichlorobenzene, peppermint, and camphor.

In the invention, it is preferable that the airship comprise a compressor for compressing air, a container for containing the air compressed by the compressor, and a control valve for releasing the air from the container with control. This configuration makes it possible to increase the load weight by compressing air with the compressor and introducing resulting compressed air into the container as well as to decrease the load weight by releasing the air from the container through the control valve. In this manner, the load weight of the airship can be changed freely. The control valve may be separate from the compressor. Or a component of the compressor may also serve as the control valve. An example of the latter case is such that air is released from the container by reversely operating the compressor.

It is preferable that the compressor and the control valve operate so as to compensate for at least part of a variation in a lifting force of the airship. Controlling the compressor and the control valve in accordance with a variation in the lifting force of the airship makes it possible to adjust the load weight of the airship, which in turn allows the airship to stay in a certain height range as well as to ascend and descend.

It is preferable that the airship be propelled or changed in posture by the released air. Using the reaction from released air as a propelling force enables movement and change in posture.

In each of the above configurations, it is preferable that the airship system be so configured that the airship flies according to a prescribed flight program. "A flight according to a prescribed flight program" means not only a flight having a predetermined flight pattern but also broadly includes a case that the airship flies according to a predetermined logical procedure, as exemplified by a case that the airship flies according to any of various computer programs.

It is preferable that communication means for communicating with the base station be provided at one or a plurality of measurement points, and that communication between the airship and the base station be performed via the communication means provided at the one or plurality of measurement points. Performing communication between the airship and the base station using the measurement points as relay points enables communication even if the airship is far away from the base station or an obstacle to communication exists between the airship and the base station. As a result, the adaptability and the flexibility of the system can be increased.

The invention provides a guidance system comprising an airship having communication means and propelling means that operates according to instructions that are given; a base station having control means and communication means capable of communicating with the airship; position measuring means for measuring a position of the airship; and means for moving the airship along a prescribed guidance route, the control means comprises instruction forming means for forming, based on the position of the airship that is measured by the position measuring means, the instructions including a flight instruction for controlling a route of the airship, and causes the communication means to send the instructions to the airship.

The invention provides a monitoring system comprising an airship having communication means, propelling means that operates according to instructions that are given, and monitoring means; a base station having control means and communication means capable of communicating with the airship; position measuring means for measuring a position of the airship; and means for moving the airship along a prescribed monitoring route, wherein the control means comprises instruction forming means for forming, based on the position of the airship that is measured by the position measuring means, the instructions including a flight instruction for controlling a route of the airship, and causes the communication means to send the instructions to the airship.

The invention provides another monitoring system comprising an airship having communication means, propelling means that operates according to instructions that are given, and monitoring means; a base station having control means and communication means capable of communicating with the airship; position measuring means for measuring a position of the airship; and means for causing the airship to follow a prescribed monitoring object, wherein the control means comprises instruction forming means for forming, based on the position of the airship that is measured by the position measuring means, the instructions including a flight instruction for controlling a route of the airship, and causes the communication means to send the instructions to the airship.

It is preferable that each of the above monitoring systems further comprise reporting means for reporting a monitoring state of the monitoring means. Examples of the reporting means are image display means for reporting a monitoring state by an image and sound output means for reporting a monitoring state by a sound.

The invention also provides an advertisement system comprising an airship having communication means, propelling means that operates according to instructions that are given, and one of sound output means and display means; a base station having control means and communication means capable of communicating with the airship; position measuring means for measuring a position of the airship; and means for moving the airship along a prescribed advertisement route, wherein the control means comprises instruction forming means for forming, based on the position of the airship that is measured by the position measuring means, the instructions including a flight instruction for controlling a route of the airship, and causes the communication means to send the instructions to the airship.

The invention also provides a robot toy system comprising an airship having communication means, propelling means that operates according to instructions that are given, detecting means, and output means; a base station having control means and communication means capable of communicating with the airship; position measuring means for measuring a position of the airship; and means for causing the output means to operate in accordance with a movement or an action of an object that can be detected by the detecting means, wherein the control means comprises instruction forming means for forming, based on the position of the airship that is measured by the position measuring means, the instructions including a flight instruction for controlling a route of the airship, and causes the communication means to send the instructions to the airship.

In each of the above guidance system, the monitoring systems, advertisement system, and robot toy system, it is preferable that the position measuring means measure positional relationships between the airship and a plurality of measurement points. It is desirable that communication means for communicating with the base station be provided at one or a plurality of measurement points, and that communication between the airship and the base station be performed via the communication means provided at the one or plurality of measurement points.

BEST MODE FOR CARRYING OUT THE INVENTION

An airship system according to an embodiment of the invention will be hereinafter described in detail with reference to the accompanying drawings.

[Airship System 100]

Figure 1:
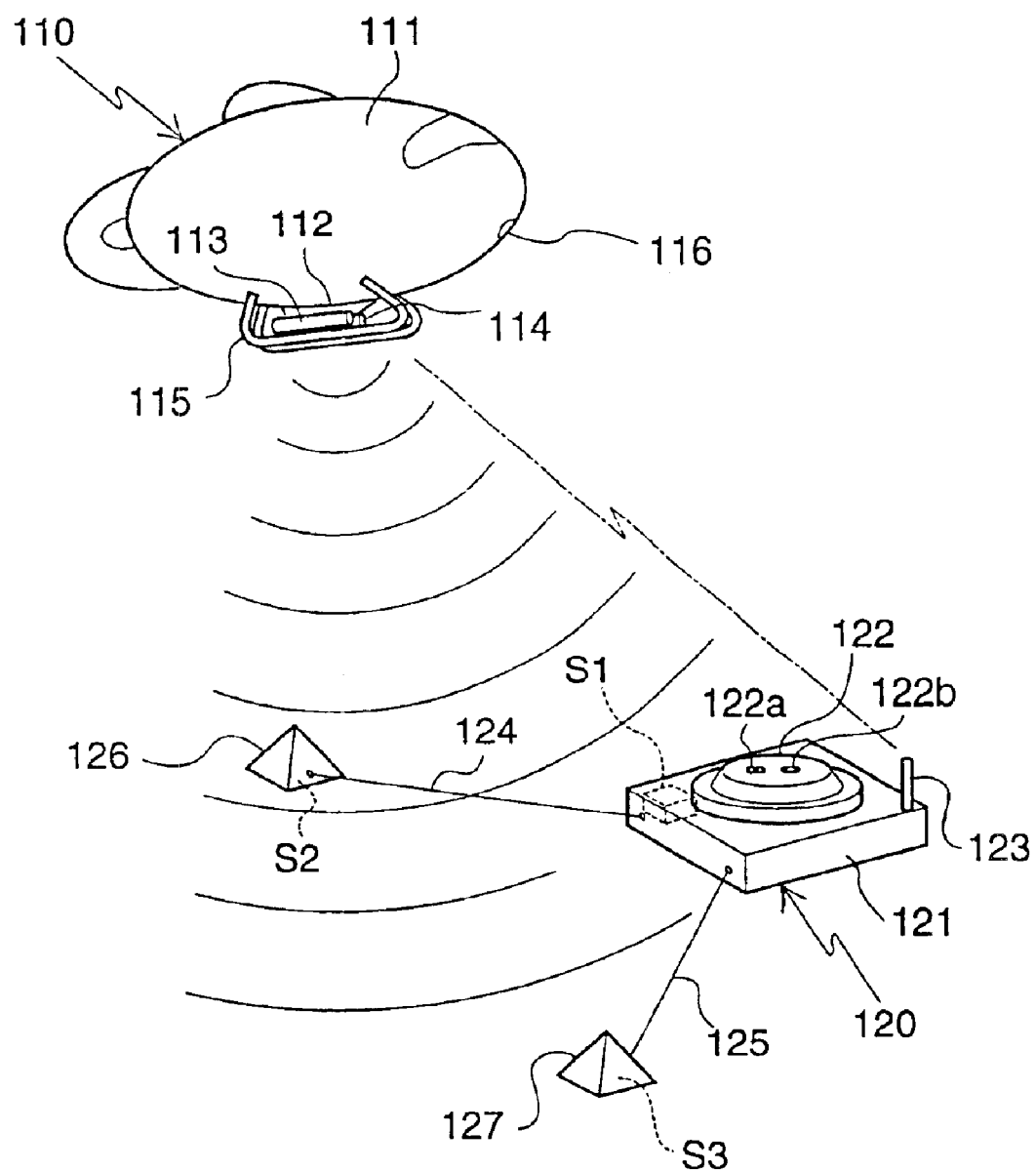
FIG. 1 is a schematic perspective view showing the entire configuration of an airship system according to an embodiment of the present invention.

FIG. 1 is a schematic view showing the configuration (appearance) of an airship system 100 according to the embodiment. The airship system 100 has an airship 110 and a base station 120. As described later, this embodiment is directed to an airship system that allows the airship 110 to fly automatically floating in a room if the base station 120 is installed in the room and in which the airship 110 is a small one that is usable as an interior item or an artificial pet.

The airship 110 is equipped with a ship main body (balloon) 111 that is filled with a ship-floating gas such as helium, a control/management section 112 that is attached to the bottom, for example, of the ship main body 111, propeller fans 113 and 114 that are attached to the right and left sides of the control/management section 112, a pair of guard bars 115 for protecting the control/management section 112 and the propeller fans 113 and 114 and for supporting the airship 110 when it lands, and an obstacle detecting sensor 116 that is provided at a front portion of the ship main body 111. For example, the obstacle detecting sensor 116 is an optical sensor having a light-emitting element and a photoreceptor element or an ultrasonic sensor having an ultrasonic wave generator and an ultrasonic wave detector. For example, each of the propeller fans 113 and 114 is such that a fan is rotationally driven by a small motor such as an electrostatic motor and is placed inside a cylinder. In this case, for example, the moving direction can be changed by changing the direction of the cylinders, rotating only one of the two fans, making the rotation speeds of the two fans different from each other, or rotating the two fans in different directions. The means for changing the moving direction may be wing members that are attached to the ship main body 111 so as to be changeable in posture.

Figure 2:
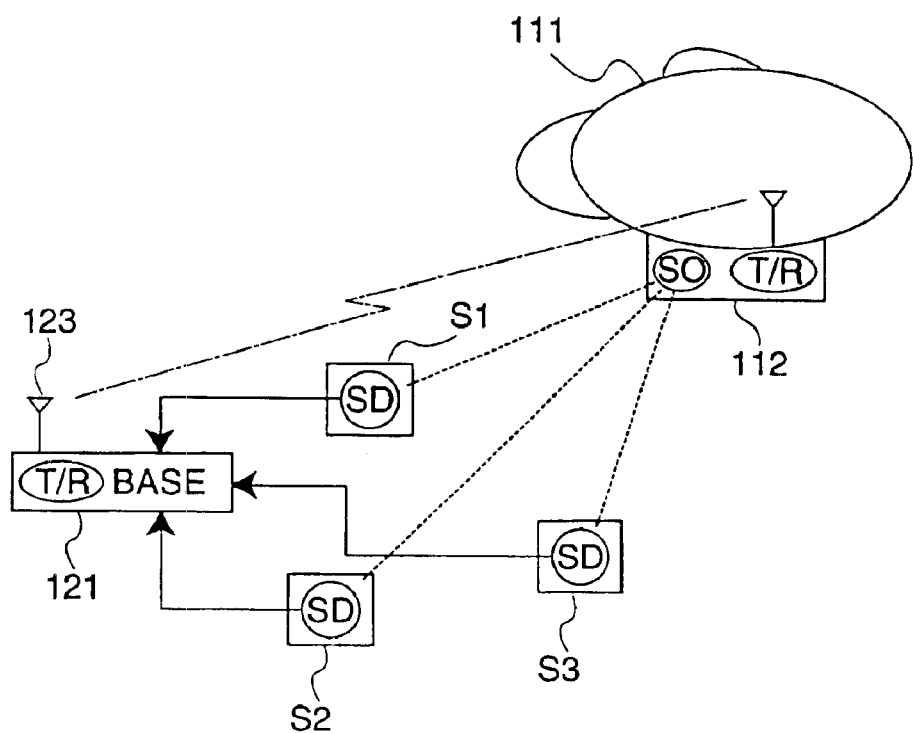
FIG. 2 illustrates a ship position measuring method according to the embodiment.

As shown in FIG. 2, the control/management section 112 incorporates a communications device T/R for performing radio communication with the base station 120, a driving circuit (not shown) for driving the propeller fans 113 and 114 as propelling means, a control circuit (not shown) for controlling the communications device T/R and the driving circuit, a valve structure (not shown) for opening or closing a gas supply path that communicates with the inside of the ship main body 111, and a battery section (not shown) for supplying power to the above circuits.

As shown in FIG. 1, the base station 120 is equipped with a base main body 121 and a base stage 122 that is provided on the base main body 121. The base main body 121 houses a circuit board on which a control circuit (described later) is formed, a charging system, a gas supply system, and a measurement point unit S1. As described later, the top surface of the base stage 122 is formed with a charging portion 122a and a gas outlet 122b that are to be connected to the airship 110. An antenna 123 projects from the base main body 121. Wiring 124 and wiring 125, which extend from the base main body 121, are connected to respective sensor containers 126 and 127. The sensor containers 126 and 127 house respective measurement point units S2 and S3.

Figure 8:
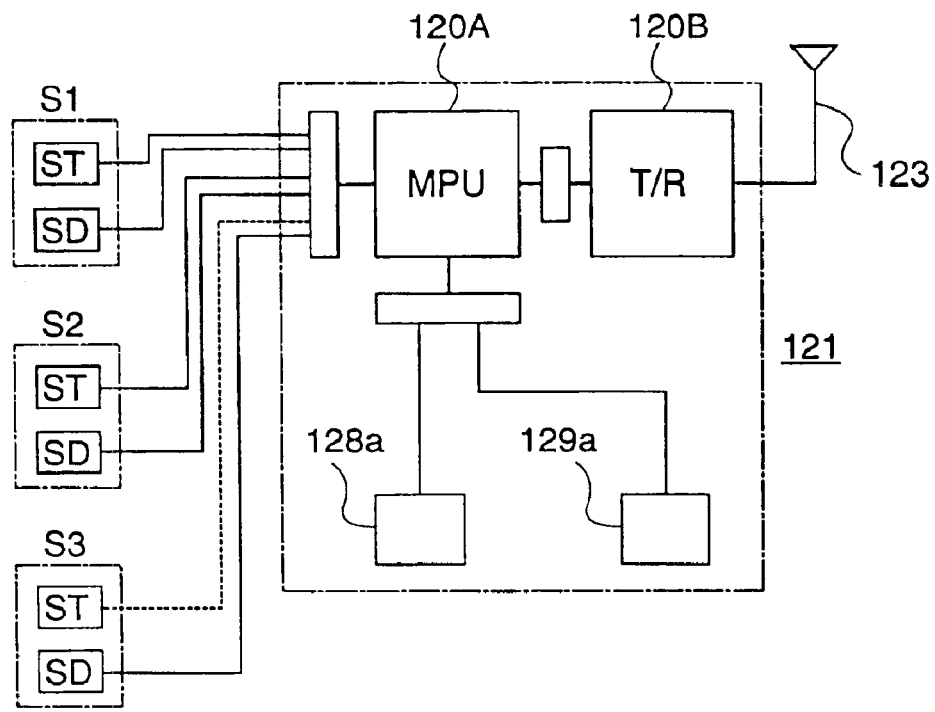
FIG. 8 is a block diagram showing a general configuration of the base station.

As shown in FIG. 8, the base main body 121 of the base station 120 incorporates an MPU (microprocessor unit) 120A including a CPU (central processing unit), a bus, a memory, and various interfaces, a communications device 120B (T/R) that is connected to the MPU 120A, a power supply controller 128a that is connected to the MPU 120A, and a gas supply controller 129a that includes a gas supply valve and is connected to the MPU 120A. The MPU 120A is connected to the measurement point units S1, S2, and S3 via an input/output circuit. The communications device 120B is connected to the antenna 123.

Figure 9:
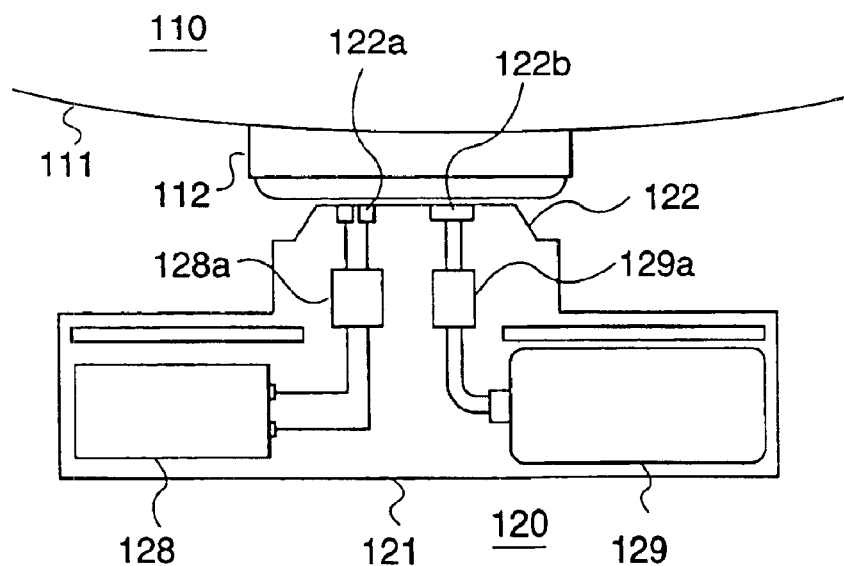
FIG. 9 shows a general internal structure of the base station.

As shown in FIG. 9, the base main body 121 of the base station 120 houses a battery 128 and a gas cylinder 129 in addition to the above circuit system. The battery 128 is connected to the charging portion 122a of the base stage 122 via the gas supply controller 128a. The gas cylinder 129 is connected to the gas outlet 122b via the gas supply controller 129a.

As shown in FIG. 2, the control/management section 112 of the airship 110 incorporates a wave generator SO for generating ultrasonic waves. Ultrasonic waves that are emitted from the wave generator SO are detected by wave detectors SD that are provided in the respective measurement point units S1, S2, and S3. Detection signal generated by the respective measurement point units S1, S2, and S3 are supplied to the base main body 121 and a position of the airship 110 is calculated based on those detection signals.

Figure 3:
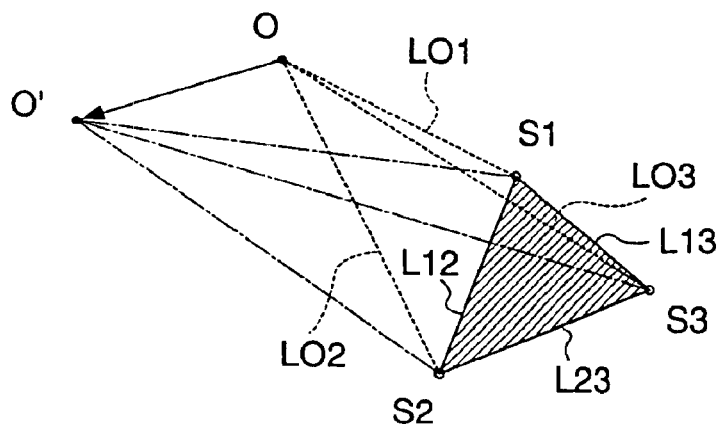
FIG. 3 illustrates the principle of the ship position measuring method according to the embodiment.

As shown in FIG. 3, the measurement point units S1, S2, and S3 are disposed at different positions. If distances L12, L23, and L13 between the three measurement point units S1, S2, and S3 are known, a relative position (three-dimensional position coordinates) of the airship 110 can be determined by using, as a reference, a plane including the three measurement points by measuring distances LO1, LO2, and LO3 from a position O of the airship to the respective measurement point units S1, S2, and S3. If the measurement point units S1, S2, and S3 are fixed, the distances LO1, LO2, and LO3 vary as the airship 110 moves from point O to point O'. Therefore, a moving direction and a moving distance of the airship 110 can be known with the above-mentioned plane as a reference.

Figure 4:
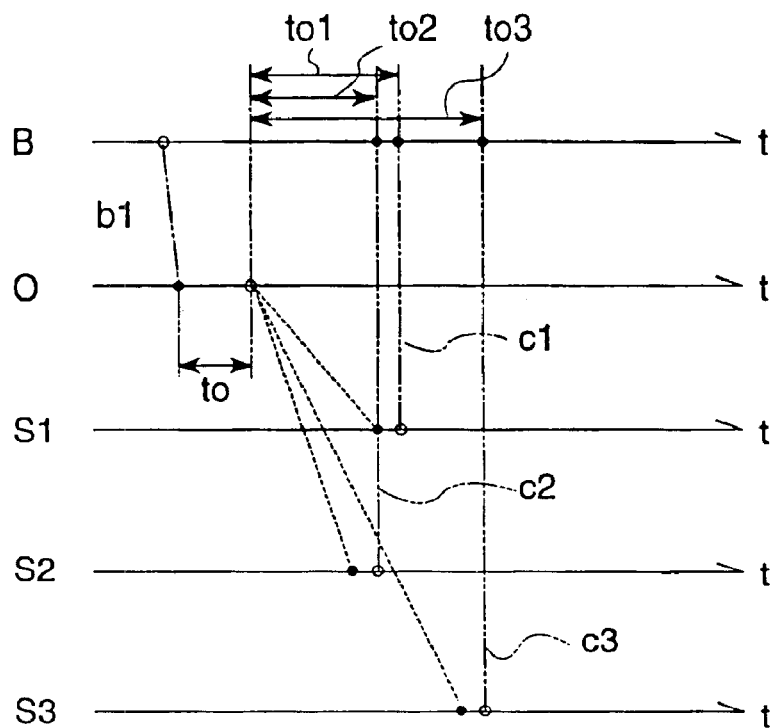
FIG. 4 is a timing chart showing a ship position measuring process according to the embodiment.
Figure 12:
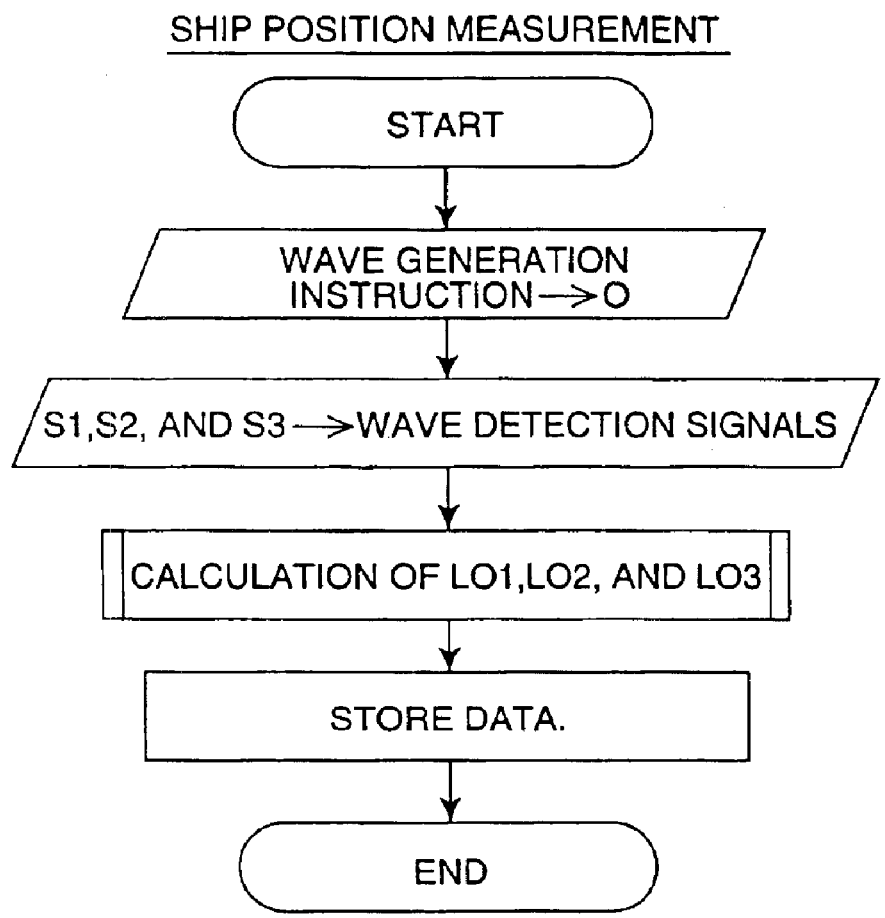
FIG. 12 is a schematic flowchart showing a procedure to be followed in the ship position measuring process.

FIG. 4 is a timing chart showing a ship position measuring process that the base station 120 detects a position of the airship 110 in the above-described manner. FIG. 12 is a schematic flowchart showing a procedure to be followed by the MPU 120A in the ship position measuring process. First, a wave generation instruction b1 that has been generated by the MPU 120A of the base station 120 at point B is sent by the communications device 120B to the airship 110 at point O by radio. The control circuit of the airship 110 causes the wave generator SO to generate ultrasonic waves after a lapse of a predetermined time to from reception of the instruction. The measurement point units S1, S2, and S3 detect the ultrasonic waves, and the wave detection signals c1, c2 and c3 are sent to the base station 120. In the base station 120, the MPU 120A determines time to1, to2, and to3 taken by the ultrasonic waves to travel from the airship 110 to the measurement point units S1, S2, and S3 (radio communication times are almost negligible) based on pieces of time information indicating time points when the detection signals c1, c2, and c3 were received, respectively. The MPU 120A calculates distances LO1, LO2, and LO3 shown in FIG. 3 based on the times to1, to2, and to3 and the propagation speed of the ultrasonic waves. The distances LO1, LO2, and LO3 are temporarily stored in the memory of the MPU 120A, and relative coordinates (i.e., position coordinates having, as a reference, the plane including the above-mentioned three measurement points) of the airship 110 are calculated based on the distances LO1, LO2, and LO3. The above distance data and the coordinate data are compared with distance data and coordinate data that will be obtained later, whereby a moving direction and a moving speed of the airship 110 is determined.

Incidentally, in this embodiment, for example, the base main body 121 of the base station 120 that incorporates the measurement point unit S1 and the sensor containers 126 and 127 that house the respective measurement point units S2 and S3 that are connected to the base main body 121 via the wiring 124 and wiring 125 are placed on the floor of a room or hung on a wall surface (see FIG. 1) so as to be given a proper positional relationship. Therefore, it is necessary to fix the base station 120 and the sensor containers 126 and 127 at prescribed positions and detect positions of the three measurement points by measuring distances between them before the airship system is put into operation.

Figure 5:
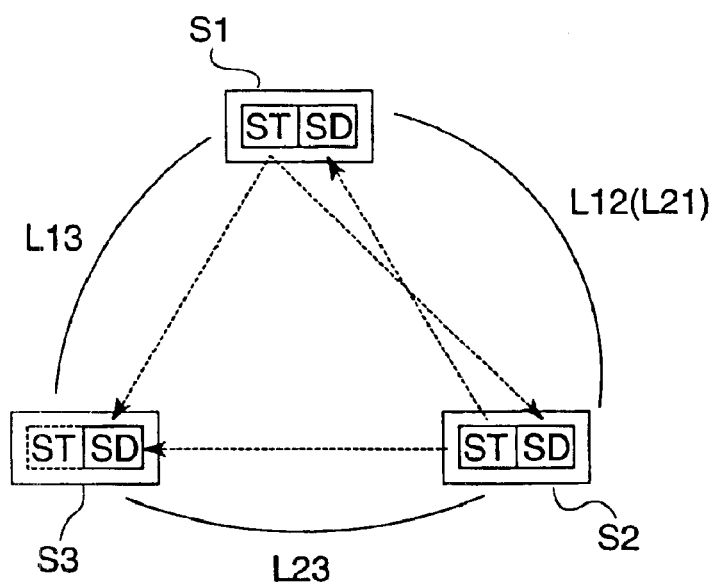
FIG. 5 is an illustration of the measurement positions detecting process according to the embodiment.
Figure 11:
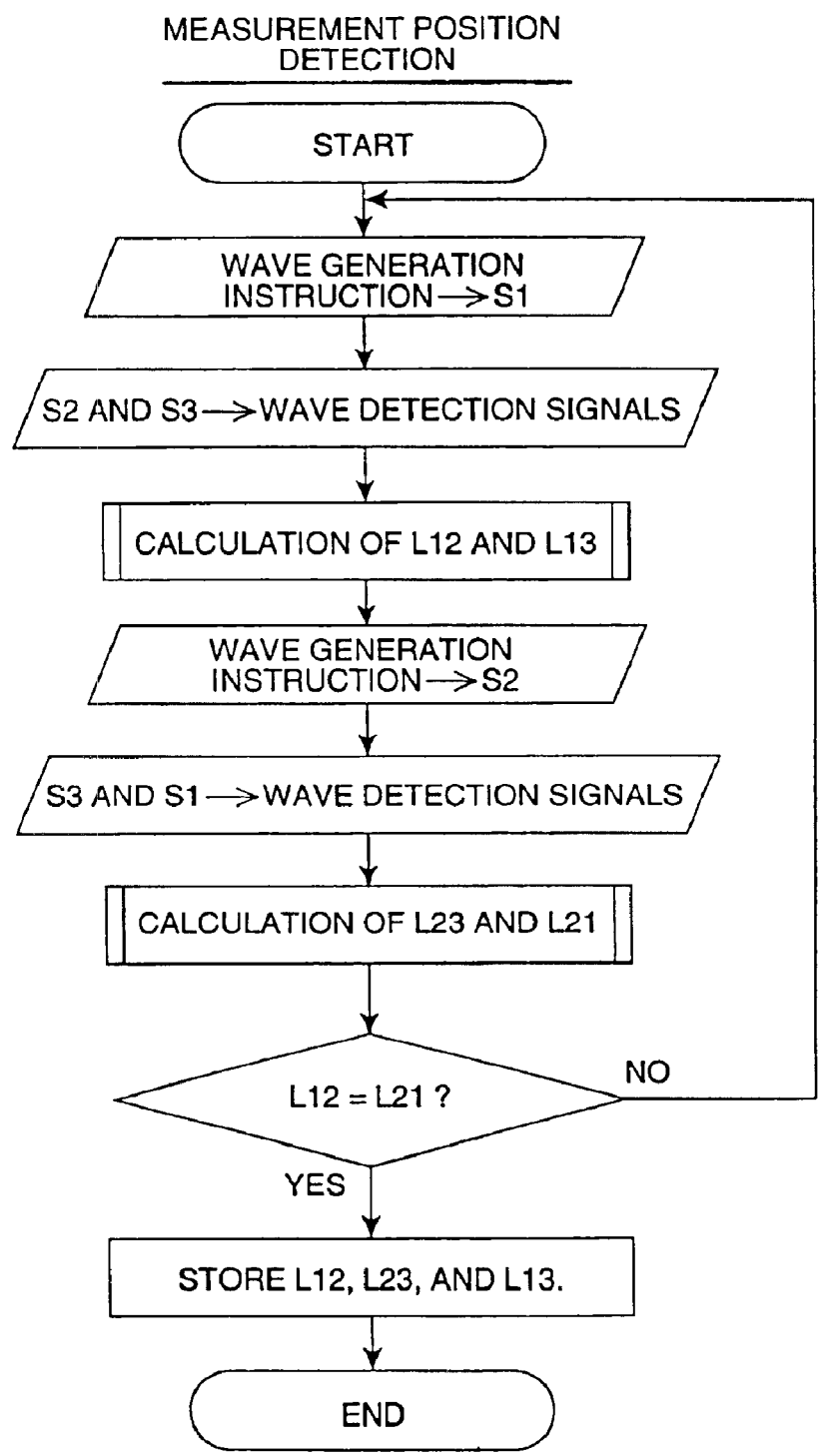
FIG. 11 is a schematic flowchart showing a procedure to be followed in the measurement positions detecting process.

FIG. 5 illustrates a measurement positions detecting process for determining distances L12, L23, and L13 between the measurement point units S1, S2, and S3 before the above-described measurement of a position of the airship 110. FIG. 11 is a schematic flowchart showing a procedure to be followed by the MPU 120A in the measurement positions detecting process.

As shown in FIG. 5, each of the measurement point units S1, S2, and S3 incorporates a wave detector SD capable of receiving ultrasonic waves and a wave generator ST for generating ultrasonic waves. Only two (in the illustrated example, the measurement point units S1 and S2) of the three measurement point units S1, S2, and S3 may be equipped with a wave generator ST.

In the embodiment, as shown in FIG. 11, first, a wave generation instruction is supplied from the MPU 120A to the measurement point unit S1, whereupon the wave generator ST of the measurement point unit S1 sends ultrasonic waves (see FIG. 5). The ultrasonic waves are detected by the wave detectors SD of the respective measurement point units S2 and S3. The MPU 120A receives resulting wave detection signals and determines distances L12 and L13 based on times from the sending to the reception of ultrasonic waves.

Then, similarly, a wave generation instruction is supplied from the MPU 120A to the measurement point unit S2, whereupon the wave generator ST of the measurement point unit S2 sends ultrasonic waves (see FIG. 5). The ultrasonic waves are detected by the wave detectors SD of the respective measurement point units S1 and S3. The MPU 120A determines distances L23 and L21 in the same manner as described above. In this manner, the distances L12, L23, and L13 between the three measurement units S1, S2, and S3 can be determined.

In the above example, the distance between the measurement point units S1 and S2 is determined redundantly as the distances L12 and L21. A calculation for determining only one of those may be performed. FIG. 11 shows an alternative procedure in which whether L12 and L21 coincide with each other is checked after calculations thereof and if they do not coincide with each other the above distance measuring process is executed again with a judgment that one or more than one of the measurement point units S1, S2, and S3 moved during the measurement.

Figure 10:
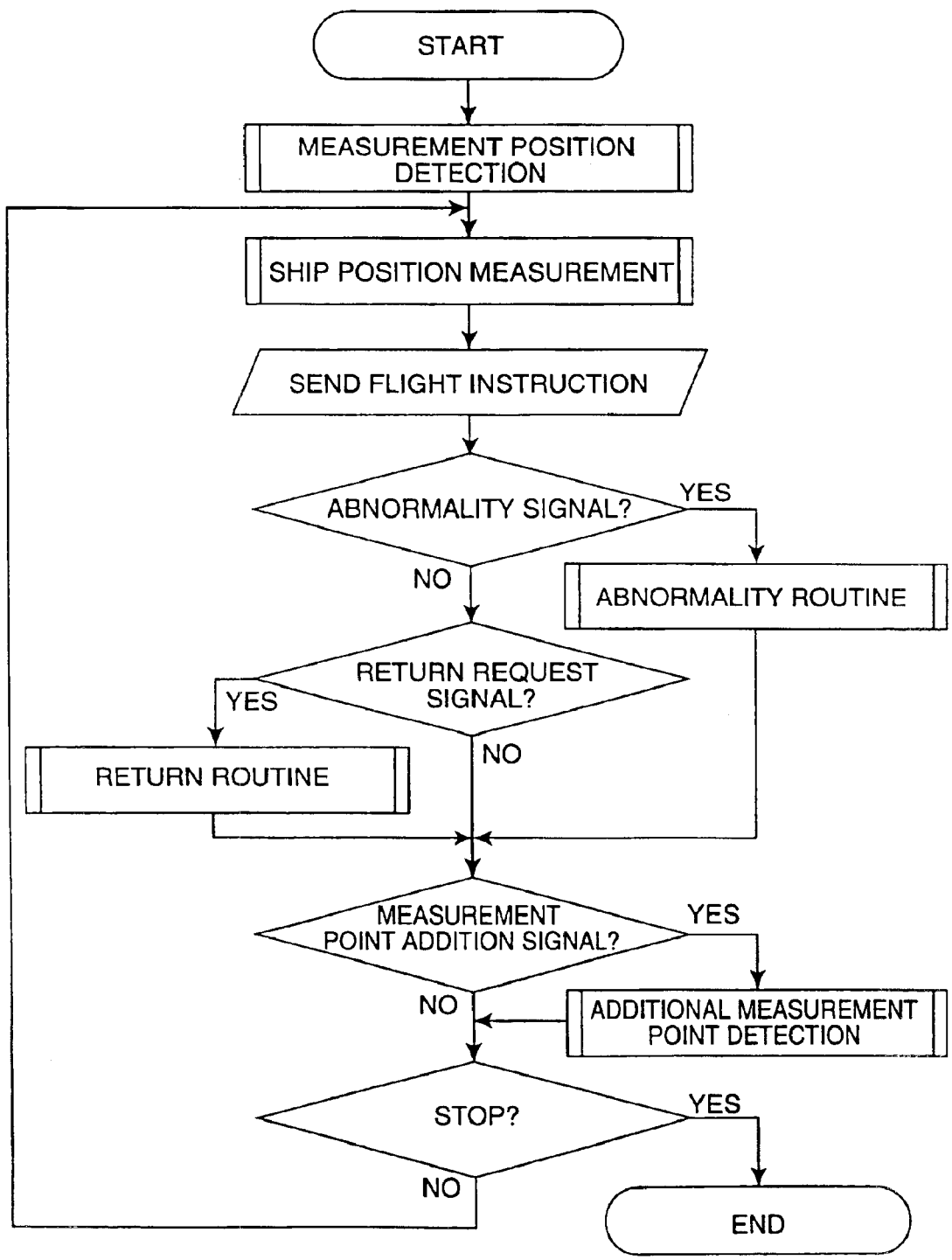
FIG. 10 is a schematic flowchart showing a procedure of an operation program of the base station.

FIG. 10 is a schematic flowchart showing a procedure to be followed by the MPU 120A to operate the airship system 100. First, a start button (not shown) or the like that is provided in the base station 120 is manipulated manually, for example, whereupon an operation program stored in, for example, the memory of the MPU 120A is started and executed. With this operation program, first, the measurement positions detecting process (i.e., the calculations of distances between the measurement point units S1, S2, and S3) that was described above with reference to FIGS. 5 and 11 is executed. The measurement positions detecting process may be executed either only at the start of a flight as shown in FIG. 10 or regularly. In the latter case, if one or more than one of the measurement points move during a flight of the airship 110, a measure may be taken so that movement distances are determined and the position information of the airship 110 is corrected in a ship position measuring process that is executed after the movement of the measurement points.

Then, the ship position measuring process that was described above with reference to FIGS. 2–4 and 12 is executed. A flight instruction for moving the airship 110 to a position that is given by a predetermined flight program is generated based on a position of the airship 110 that has been obtained by the ship position measuring process and sent to the airship 110.

Then, the MPU 120A checks whether an abnormality signal or a return request signal has been received from the airship 110. The MPU 120A executes an abnormality routine if an abnormality signal has been received, and executes a return routine if a return request signal has been received.

For example, the abnormality routine forcibly shuts off the supply of power to the control/management section 112 when the airship 110 does not operate according to a flight instruction because, for example, the control circuit, the driving circuit, the propelling means such as the propelling fans 113 and 114, or some other device of the airship 110 malfunctions or the lifting force has disappeared for some reason.

The abnormality routine may be such as to forcibly return the airship 110 onto the base stage 122 of the base station 120 as in the case of the return route (described later) if the airship 110 does not operate according to a flight instruction but can fly to a certain extent.

The abnormality routine includes the following routine. If the obstacle detecting sensor 116 that is provided on the airship 110 detects an obstacle ahead of the airship 110 in the traveling direction, the MPU 120A generates a flight instruction for controlling the airship 110 so that it will travel off a scheduled route temporarily, whereby the airship 110 will avoid the obstacle. When the obstacle is no longer detected, the MPU 120A sends a flight instruction for returning the airship 110 to the original route, whereby the airship 110 will return to the scheduled route.

In the embodiment, as described above, the system is configured in such a manner that an obstacle avoiding operation is performed according to an instruction that is sent from the base station 120. This makes it possible to make the control circuit etc. of the airship 110 even simpler. However, the system may be configured in such a manner that the airship 110 automatically performs an avoiding operation by its own volition when the obstacle detecting sensor 116 detects an obstacle. In this case, the airship 110 may operate in such a manner as to temporarily take a route different from a route that is given by a flight instruction from the base station 120 until the obstacle is no longer detected and then to return to the flying state according to the flight instruction when the obstacle is no longer detected.

Figure 13:
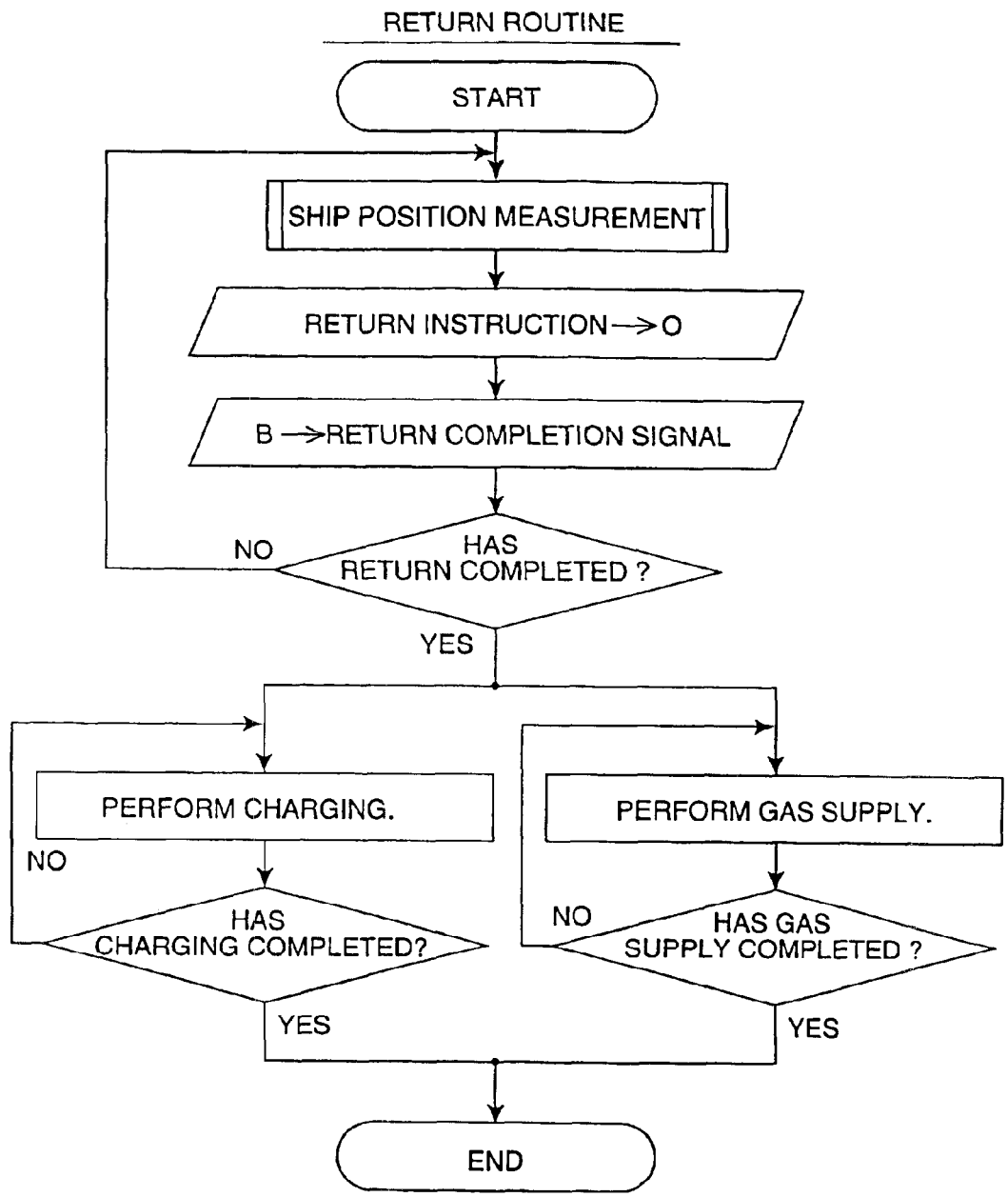
FIG. 13 is a schematic flowchart showing the procedure of a return routine.

The return routine is to return the airship 110 onto the base stage 122 of the base station 120 by the MPU 120A's operating according to a schematic flowchart of FIG. 13 when receiving a return request signal from the airship 110. With the return routine, as shown in FIG. 13, the airship 110 is guided onto the base stage 122 by sending, to the airship 110, a return instruction that is suitable for a present position of the airship 110 measured by the same ship position measuring process as described above. When the airship 110 arrives at the base stage 122, a return completion signal is output from a sensor that is incorporated in the base stage 122. Receiving the return completion signal, the MPU 120A controls the charging controller 128a to start a charging operation on the control/management section 112 of the airship 110 via the charging portion 122a. Similarly, the MPU 120A controls the gas supply controller 129a to start a gas supplying operation on the airship 110. The charging operation and the gas supplying operation may be performed simultaneously as shown in FIG. 13 or one by one. When receiving a charging completion signal from the control/management section 112 of the airship 110, the MPU 120A sends a control signal to the charging controller 128a to finish the charging operation. Similarly, when receiving a gas supply completion signal from the control/management section 112, the MPU 120A sends a control signal to the gas supply controller 129a to finish the gas supplying operation.

After the completion of the charging operation and the gas supplying operation, the MPU 120A causes the airship 110 to take off again according to the operation program of FIG. 10 and then causes the airship 110 to fly according to the prescribed flight program.

If a new measurement point unit is installed in addition to the measurement point units S1–S3 as the measurement points while the airship 110 is flying in the above-described manner, a measurement point addition signal is generated, whereupon additional measurement point position detection is performed. The additional measurement point position detection is a process for determining a position of the new measurement point unit. More specifically, relative positional relationships between the new measurement point unit and the other measurement point units S1–S3 are determined. Relative positional relationships can be determined by calculating distances between the new measurement point unit and the measurement point units S1–S3. The additional measurement point position detection will be described in more detail in describing another airship system. If no measurement point addition signal is generated, the current flying state is maintained. The flight continues until an end manipulation such as depression of a stop button is performed as shown in FIG. 10.

As described above, according to the embodiment, the airship 110 flies automatically according to a flight program. If the power or the ship-floating gas (e.g., helium) goes short halfway, the airship 110 automatically returns onto the base stage 122, is automatically subjected to charging and gas supply, and then starts flying again.

In the embodiment, the airship 110 is automatically controlled based on instructions (a wave generation instruction, a flight instruction, a return instruction, etc.) from the base station 120. This makes it unnecessary to equip the airship 110 with a complex control circuit that is of high-performance and large in power consumption, such as an MPU. The only sensor that is provided in the airship 110 is the obstacle detecting sensor 116 for detecting an obstacle on a route. This makes it possible to have the weight and the power consumption of the control/management section 112 much smaller than in the conventional cases.

The above features are very important to small airships capable of flying even indoors like the one in the embodiment. This is because where a balloon that is filled with an airship-floating gas is spherical, for example, a positive correlation that is represented by a cubic function exists between the diameter and the lifting force; the lifting force decreases steeply as the diameter of a balloon decreases. For example, where a spherical balloon having a diameter 30 cm is filled with helium as an airship-floating gas, a weight to balance with the lifting force is about 15 g. When the balloon weight etc. are taken into consideration, a maximum load that is enabled by the balloon to float is as light as about 8 g; it is difficult to lift an airship having a conventional configuration. However, for indoor uses, an airship is difficult to handle unless the diameter of a balloon is about 30–50 cm, about 1 m at the most.

In the embodiment, the base station 120 and the sensor containers 126 and 127 that house the respective measurement point units S2 and S3 are separate bodies and connected to each other by the wiring 124 and wiring 125. However, the invention is not limited to such a configuration.

Figure 6:
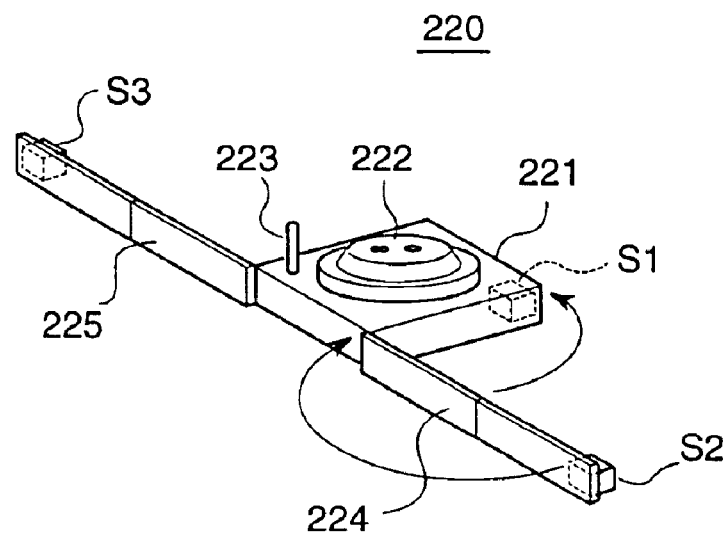
FIG. 6 is a perspective view showing the structure of a base station that is different from a base station shown in FIG. 1.

For example, FIG. 6 shows another base station 220. Whereas the base station 220 is the same as the base station 120 of the above embodiment in having a base station main body 221 incorporating the measurement point unit S1, a base stage 222, and an antenna 223, the base station 220 is different from the base station 120 in that the measurement point units S2 and S3 are connected to the base main body 221 by respective folding connection arms 224 and 225. Each of the connection arms 224 and 225 can be bent at two positions as indicated by arrows in FIG. 6 to become into a compact shape and to be placed on a side surface of the base main body 221.

Figure 7:
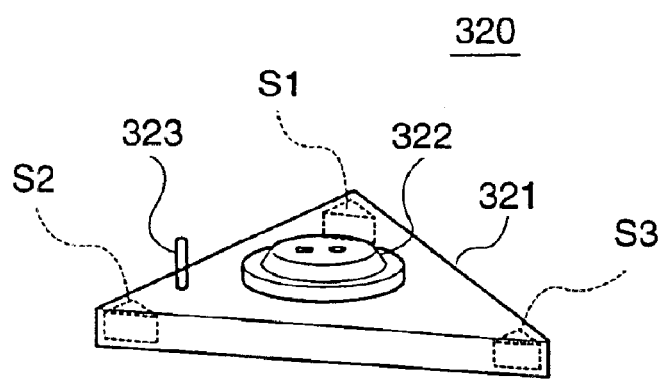
FIG. 7 is a perspective view showing the structure of still another base station.

FIG. 7 shows still another base station 320. Whereas the base station 320 has a base main body 321, a base stage 322, and an antenna 323, all the measurement point units S1, S2, and S3 are housed in the base main body 321.

Yet another example is such that all of the three measurement point units S1, S2, and S3 are located outside a base main body. A further example is such that information exchange between a base main body and each measurement point unit is performed by a wireless communication means (e.g., by radio).

[Airship System 400]

Figure 14:
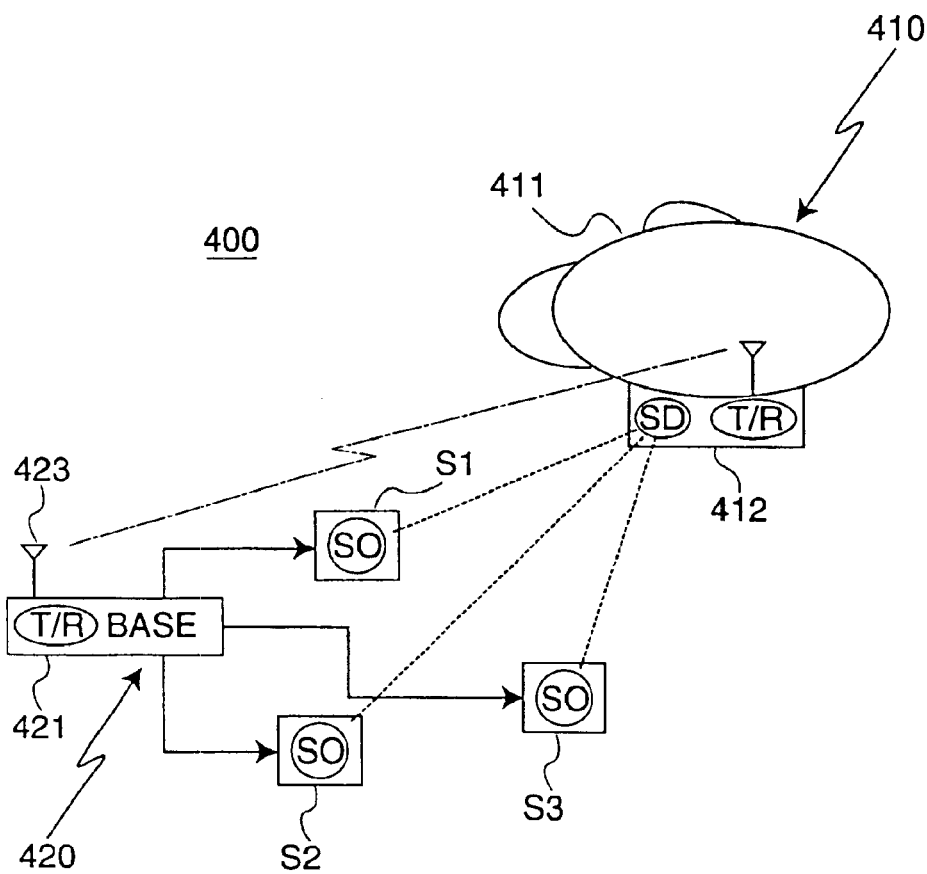
FIG. 14 is a schematic perspective view showing the entire configuration of another airship system.

FIG. 14 shows another airship system 400. Like the airship system 100 according to the above embodiment, the airship system 400 has an airship 410 that is provided with a ship main body 411 and a control/management section 412, a base station 420 that is provided with a base main body 421 and an antenna 423, and three measurement point units S1–S3 as measurement points. However, in the airship system 400, each of the measurement point units S1–S3 forming the measurement points incorporates a wave generator SO for generating ultrasonic waves and the control/management section 412 incorporates a wave detector SD for detecting ultrasonic waves. In the airship system 400, to perform the above-described measurement point detection, it is preferable that each of the measurement point units S1–S3 incorporate a wave detector as in the case of the above embodiment.

In the airship system 400, distances between the airship 410 and the respective measurement point units S1–S3 can be measured in the following manner: the wave generators SO that are incorporated in the respective measurement point units S1–S3 emit ultrasonic waves and the wave detector SD that is provided in the airship 410 detects those ultrasonic waves. The wave generators SO of the plurality of measurement point units generate ultrasonic waves one after another and the wave detector SD of the control/management section 412 detects those ultrasonic waves sequentially. For example, first, the wave generator SO of the measurement point unit S1 emits ultrasonic waves and the wave detector SD of the control/management section 412 detects the ultrasonic waves. Then, the wave generator SO of the measurement point unit S2 emits ultrasonic waves and the wave detector SD of the control/management section 412 detects the ultrasonic waves. Finally, the wave generator SO of the measurement point unit S3 emits ultrasonic waves and the wave detector SD of the control/management section 412 detects the ultrasonic waves.

Every time the wave detector SD detects ultrasonic waves emitted from the measurement point unit S1, S2, or S3, a communications device T/R of the control/management section 412 sends a signal to the base station 420. The base station 420 receives the signal with the antenna 423 and demodulates the signal with a communications device T/R (corresponds to the communications device 120B in the above embodiment) that is incorporated in the base main body 421. The base main body 421 determines distances LO1–LO3 between the airship 410 and the measurement point units S1–S3 based on times from time points when the base main body 421 sends control signals for causing the wave generators SO of the measurement point units S1–S3 to generate ultrasonic waves to time points when signals coming from the communications device T/R of the control/ management section 412 are received by the communications device T/R of the base main body 421, respectively. The distances LO1–LO3 correspond to times from time points when wave generators SO of the measurement point units S1–S3 emit ultrasonic waves to time points when the wave detector SD of the control/management section 412 of the airship 410 detects the ultrasonic waves, respectively.

[Airship System 500]

Another airship system 500 will be described below with reference to FIGS. 15–23. The airship system 500 has almost the same hardware configuration as the airship system 100 or 400. Therefore, the same components of the airship system 500 as the components in the airship system 100 or 400 are given the same names as the latter. The airship system 500 will be described only for a detailed operation that is performed when a new measurement unit is added to the measurement point units S1–S3.

Figure 15:
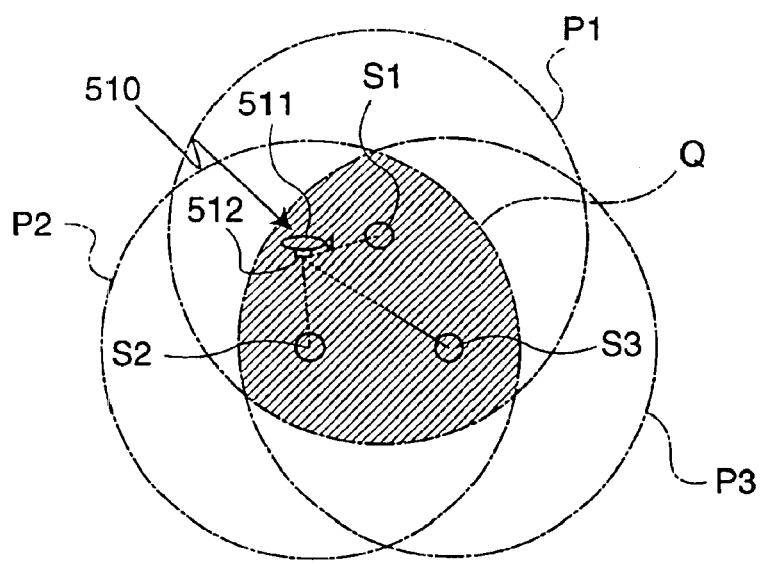
FIG. 15 illustrates an airship position measurable area in an airship system.

In the airship system 500, as shown in FIG. 15, a position-measurable area Q (hatched in FIG. 15) where the airship 510 can be controlled by means of the measurement point units S1–S3 is an overlap of three areas P1–P3 where distances between the airship 510 and the measurement point units S1–S3 can be measured, respectively. This is because a position of the airship 510 cannot be determined if even one of distances between the airship 510 and the measurement point units S1–S3 is rendered unmeasurable.

Figure 16:
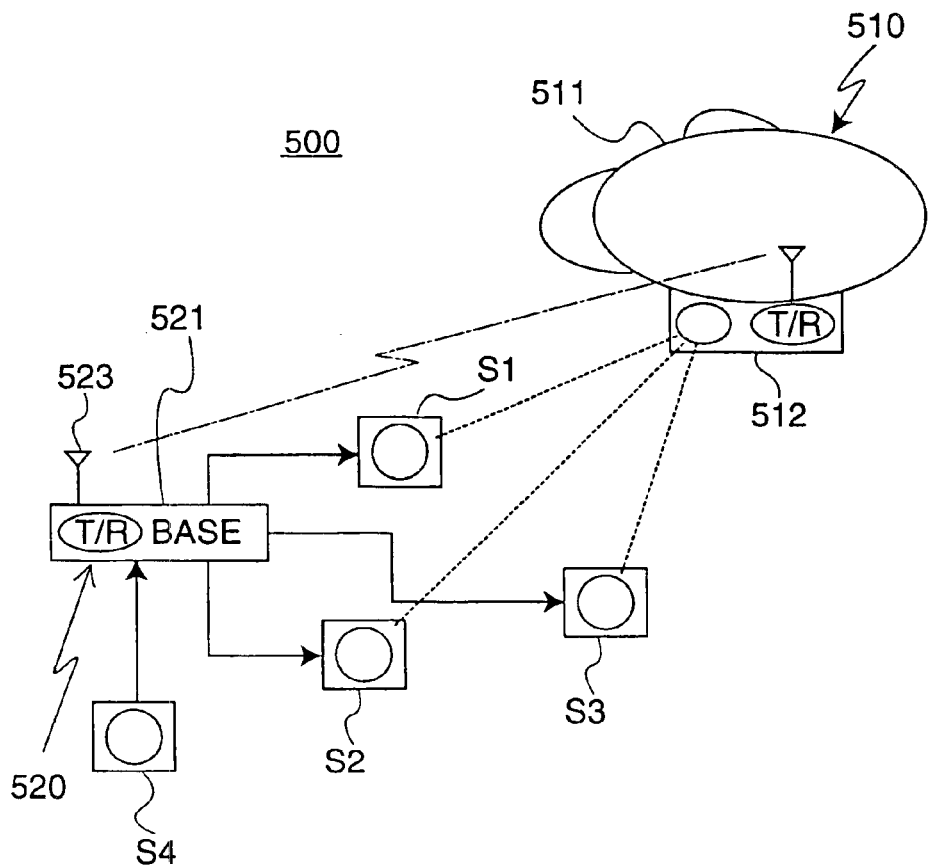
FIG. 16 is a schematic perspective view showing a state that a new measurement point unit is added to the airship system.

Consideration will be given to a case that a new measurement point unit S4 is added to the airship system 500 as shown in FIG. 16. The measurement point unit S4 is connected to the base main body 521 of the base station 520 in the same manner as the other measurement point units S1–S3 are. Once relative positions of the new measurement point unit S4 with respect to the other measurement point units S1–S3 are determined, in the airship system 500 a position of the airship 500 can be measured by using the measurement point unit S4.

Figure 17:
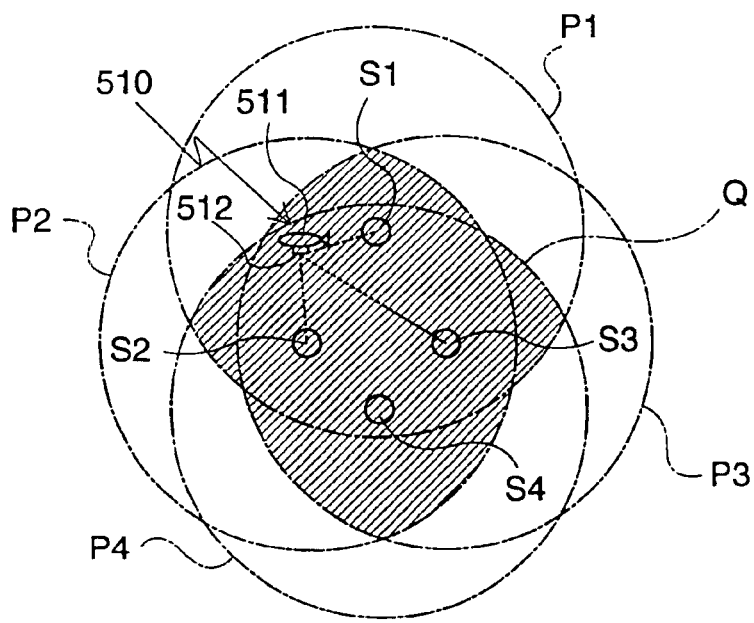
FIG. 17 illustrates an airship position measurable area of a state that a new measurement point unit is added.

FIG. 17 shows a position-measurable area Q (hatched in FIG. 17) where the airship 510 can be controlled in the case where the new measurement position unit S4 is also used. Symbol P4 denotes an area where a distance between the airship 510 and the measurement position unit S4 can be measured. The position-measurable area Q (hatched in FIG. 17) is an area where any three of the areas P1–P4 overlap with each other. Therefore, The position-measurable area Q of FIG. 17 is larger than that of FIG. 15.

Next, an additional measurement point position detecting process that is executed when the new measurement point unit S4 is added will be described with reference to FIGS. 16–20. When the new measurement point unit S4 is connected to the base main body 521 as shown in FIG. 16, a measurement point addition signal is generated. An additional measurement point position detecting process shown in FIG. 20 is performed in response to the measurement point addition signal.

In the additional measurement point position detecting process, first, a wave generation instruction is sent to the measurement point unit S1 and ultrasonic waves are emitted from the wave generator of the measurement point unit S1. If the wave detector of the measurement point unit S4 succeeds in detecting the ultrasonic waves, a distance L14 between the measurement point units S1 and S4 is calculated. If the wave detector of the measurement point unit S4 can not detect the ultrasonic waves, the process goes to the next step without calculating a distance L14. Then, a wave generation instruction is sent to the measurement point unit S2 and ultrasonic waves are emitted from the wave generator of the measurement point unit S2. If the wave detector of the measurement point unit S4 succeeds in detecting the ultrasonic waves, a distance L24 between the measurement point units S2 and S4 is calculated. If the wave detector of the measurement point unit S4 can not detect the ultrasonic waves, the process goes to the next step without calculating a distance L24. Then, a wave generation instruction is sent to the measurement point unit S3 and ultrasonic waves are emitted from the wave generator of the measurement point unit S3. If the wave detector of the measurement point unit S4 succeeds in detecting the ultrasonic waves, a distance L34 between the measurement point units S3 and S4 is calculated. If the wave detector of the measurement point unit S4 can not detect the ultrasonic waves, the process goes to the next step without calculating a distance L34.

After the execution of the above steps, if the three distances L14, L24, and L34 are calculated, the distances L14, L24, and L34 are stored and the process is finished. All of three distances between the new measurement point unit S4 and the existing measurement point units S1–S3 can be measured as in the above case when all of the existing measurement point units S1–S3 are located in the area P4 of the new measurement point unit S4.

Figure 18:
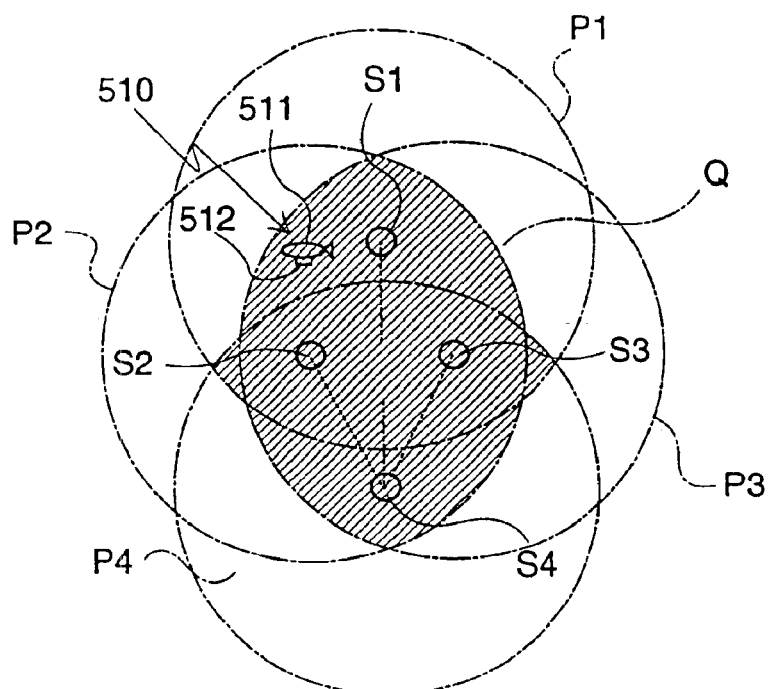
FIG. 18 illustrates another airship position measurable area of a state that a new measurement point unit is added.

However, it is not necessarily the case that all distances between the new measurement point unit S4 and the existing measurement point units S1–S3 can be measured. For example, in an example shown in FIG. 18, the measurement point units S2 and S3 are the only measurement point units whose distances from the measurement point unit S4 can be measured. The distance between the measurement point units S1 and S4 cannot be measured because the measurement point unit S1 is located outside the area P4 of the measurement point unit S4. In the case of FIG. 18, only two of the three distances can be calculated by the above steps. In this case, the position of the measurement point unit S4 can still be determined if it is located in the plane where the existing measurement point units S1–S3 are arranged. However, the position of the measurement point unit S4 cannot be determined if that is not the case.

Therefore, in this case, as shown in FIG. 20, since a measurement point that is located outside the area P4 of the new measurement point unit S4 has been found, a display A is made that substantially inquires what processing the user wants. For example, it is inquired whether the new measurement point unit S4 should be moved or whether the new measurement point unit S4 is located in the same plane as the existing measurement point units S1–S3 are. If moving the new measurement point unit S4 is selected and a manipulation S is performed after a movement of the new measurement point unit S4, the above steps are executed again to determine three distances.

On the other hand, if the new measurement point unit S4 is located in the same plane as the existing measurement point units S1–S3 are (e.g., all the measurement point units S1–S4 are located on the floor surface) and a corresponding manipulation T is performed, a flag indicating that all the measurement point units S1–S4 are located in the same plane is set. Only the two calculated distances are stored and the process is finished. In this case, since the measurement point units S1–S4 are located in the same plane, the position of the measurement point unit S4 can be determined as long as two distances are known.

Figure 19:
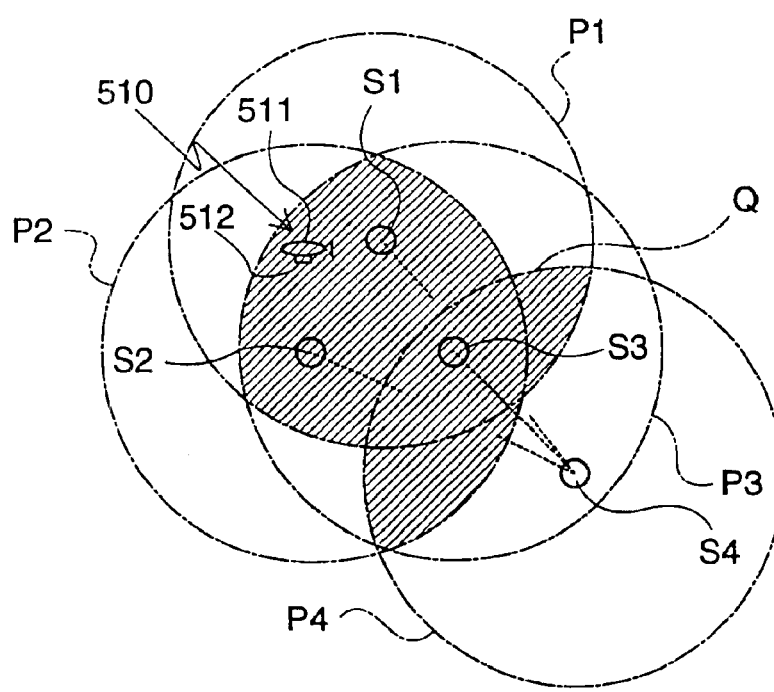
FIG. 19 illustrates still another airship position measurable area of a state that a new measurement point unit is added.
Figure 20:
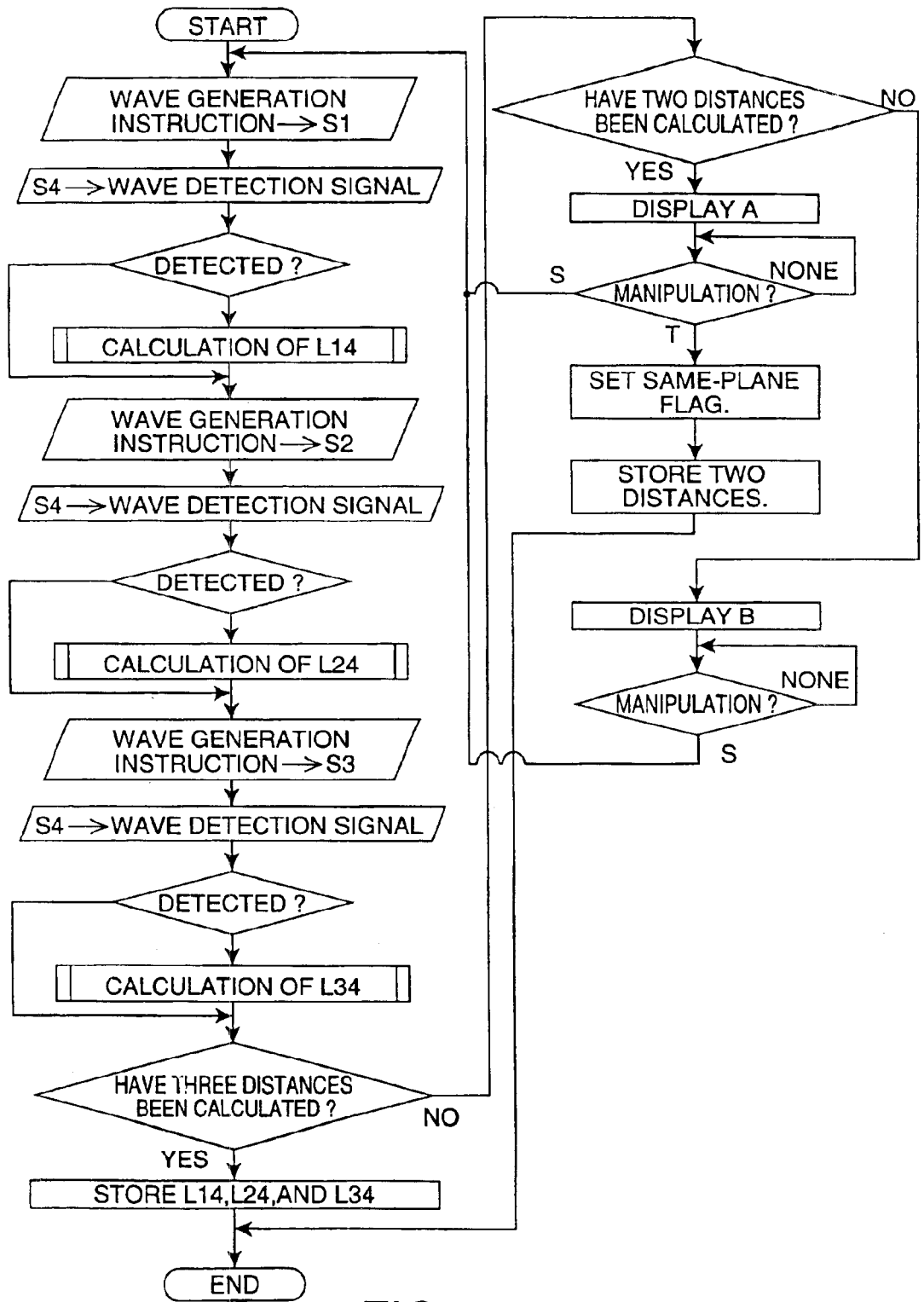
FIG. 20 is a schematic flowchart showing the procedure of an additional measurement point detecting process that is executed when a new measurement point unit is added.

FIG. 19 shows another state that occurs when the new measurement point unit S4 is added: the measurement point unit S3 is the only existing measurement point unit whose distance from the measurement point unit S4 can be measured. There is still another case (not shown) that there are no existing measurement point units whose distances from the measurement point unit S4 can be measured. In either case, the position of the new measurement point unit S4 cannot be determined and hence a display B is made that requests movement of the added measurement point unit S4. If the measurement point unit S4 is moved in response to the display B and then a prescribed manipulation S is performed, the above-described distance measuring steps are executed again.

Figure 21:
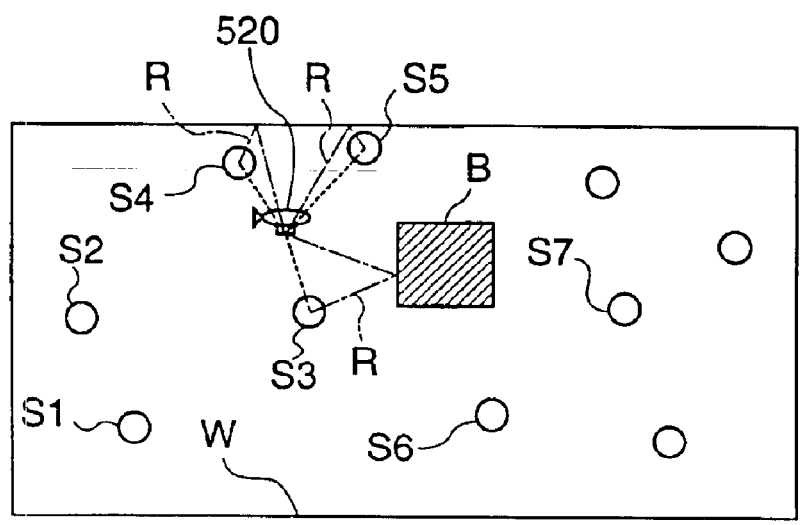
FIG. 21 is a schematic diagram showing a situation that the airship system is applied to a space having walls and a prop.
Figure 22:
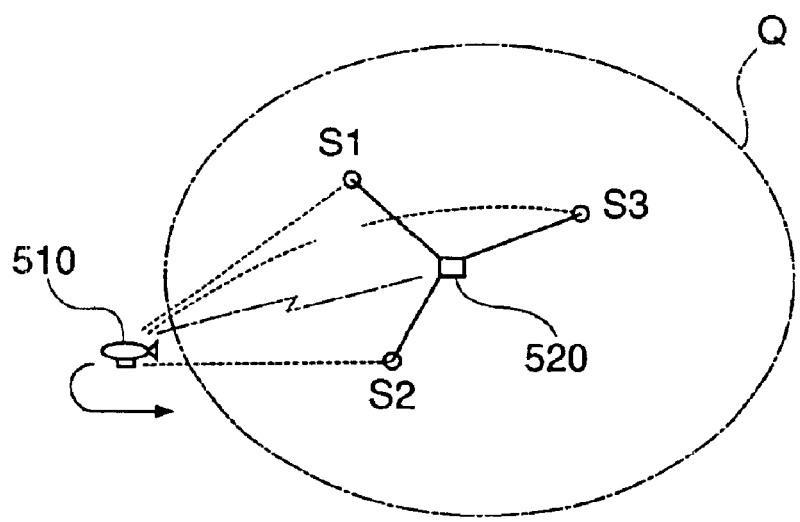
FIG. 22 is a schematic diagram showing an operation that is performed when the airship moves outside a position-measurable area of the airship system.

In the above-described manner, in the airship system 500, a new measurement point unit S4 is added to the existing measurement point units S1–S3 and the position of the measurement point unit S4 is determined, which makes it possible to measure a position of the airship 510 using the measurement point units S1–S4. This means expansion of the airship position measurable area Q. Since a plurality of new measurement point units can be added one after another in the above-described manner, it becomes possible to control the airship 510 in a wide area by using a lot of measurement point units in, for example, a manner shown in FIG. 21.

Where a position of the airship 510 is determined by using more-than-three measurement point units as described above, three shortest-distant measurement point units can be selected and used. For example, where ultrasonic waves are emitted from the airship 510 and detected by the measurement point units as in the case of the airship system 100, a position of the airship 510 is measured by using detection timing of only three measurement point units in early detection order of the ultrasonic waves. This makes it possible to prevent an event that position coordinates of the airship 510 are calculated erroneously by detecting ultrasonic waves R reflected by the surface of a wall W, a prop B, or the like as shown in FIG. 21. It is also possible to select three measurement point units that are closest to a position coordinates of the airship 510 that was obtained by a preceding position measurement and to measure a position of the airship 510 by causing the selected measurement point units to generate ultrasonic waves one after another.

Where ultrasonic waves are emitted from the measurement point units one after another and detected by the airship system 510 as in the case of the airship system 400, a position of the airship system 510 can be determined correctly by selecting three measurement point units closest to the airship 510 based on its position coordinates that were obtained by a preceding position measurement and causing the selected measurement point units to emit ultrasonic waves one after another.

In either of the above cases, if an obstacle (e.g., the prop B shown in FIG. 21) exists on a straight line connecting a measurement point unit and the airship 510, the measurement point unit may be excluded from selection candidates even if it is close to the airship 510. A trouble as would otherwise be caused by ultrasonic waves that are reflected by the surface of the prop B, the walls W, etc. can be prevented by using only timing of earliest detection of ultrasonic waves.

In the airship system 500, a position of the airship 510 can be measured in the airship position measurable area Q and the airship 510 can be controlled based on the measured position. However, if the airship 510 goes out of the position measurable area Q or an obstacle or the like disables the airship position measurement, the airship 510 can no longer be controlled correctly.

In view of the above, the airship system 500 is so configured that the airship 510 can automatically reverse the traveling direction as soon as the airship position measurement is disabled. That is, the airship position measurement is performed constantly during a flight of the airship 510 and the airship 510 is controlled so as to reverse the traveling direction as soon as the airship position measurement is disabled. Where the system is configured in such a manner that ultrasonic waves are emitted from the airship 510 and detected by the measurement point units S1–S3, the traveling direction of the airship 510 is reversed as soon as the airship position measurement is disabled by a control that is performed by the base station 520 or a control that is performed by the control/management section 512 of the airship 510 and that is started by the base station 520's sending, to the airship 510, a signal to the effect that the airship 510 went out of the position-measurable area Q.

On the other hand, where ultrasonic waves are emitted from the measurement point units and detected by the airship 510, the system may be so configured that the airship 510 reverses the traveling direction by its own volition as soon as it becomes unable to detect ultrasonic waves. Even in this case, naturally the base station 520 may control the airship 510 so that the airship 510 will reverse the traveling direction based on a communication, sent from the airship 510 to the base station 520, to the effect that the airship 510 has detected ultrasonic waves.

As described above, when the airship 510 goes out of the position-measurable area Q, the airship 510 reverses the traveling direction, and as a result, the airship 510 will return to the position-measurable area Q. Alternatively, the system may be configured in such a manner that the airship 510 descends when the airship 510 goes out of the position-measurable area Q or the airship position measurement becomes impossible.

Figure 23:
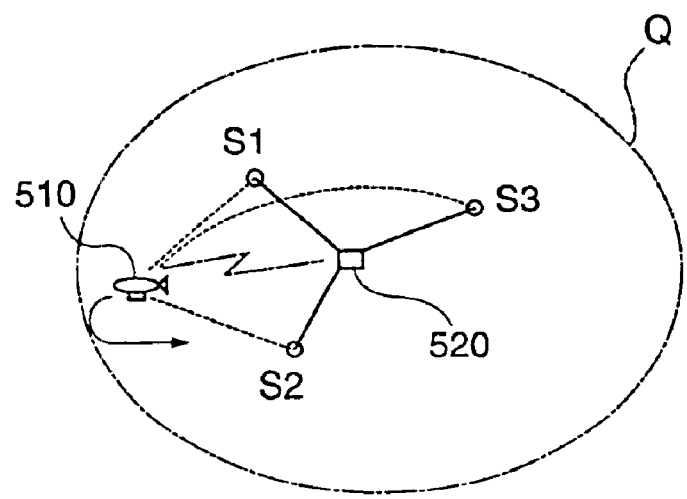
FIG. 23 is a schematic diagram showing an operation that is performed when the airship comes close to the fringe of a position-measurable area of the airship system.

In the airship system 500, control may be so made that the airship 510 stays in the position-measurable area Q instead of the above-described control in which the route is changed only when the airship 510 goes out of the position-measurable area Q. For example, as shown in FIG. 23, an imaginary position-measurable area Q is set in advance and if it is expected that the position coordinates of the airship 510 obtained by the position measurement will go out of the spatial-coordinate range of the thus-set position-measurable area Q, the traveling direction of the airship 510 is changed so that it will not out of the position-measurable area Q.

[Airship 610]

An airship 610 as an exemplary airship that can be used in any of the above airship systems will be described below with reference to FIG. 24. The airship 610 is the same as the airships of the above embodiments in that a control/management section 612 is connected to a ship main body 611 that is filled with a ship-floating gas. The airship 610 is equipped with a container 613 capable of containing a compressed gas and a compressor 614 capable of compressing air to be contained in the container 613.

The compressor 614 can compress external air and introduce resulting compressed air into the container 613 under the control of the control/management section 612 during a normal operation, and can release compressed air from the container 613 to the outside during a reverse operation. Although the container 613 need not be a rigid body, it is preferable that the capacity of the container 613 not exceed a predetermined value even if the internal pressure increases.

The weight (load weight) of the airship 610 can be increased by compressing external air and introducing resulting compressed air into the container 613 by causing the compressor 614 to perform a normal operation. Conversely, the weight (load weight) of the airship 610 can be decreased by releasing compressed air from the container 613 by causing the compressor 614 to perform a reverse operation. Therefore, the airship 610 can be moved upward or downward by operating the compressor 614.

Figure 24:
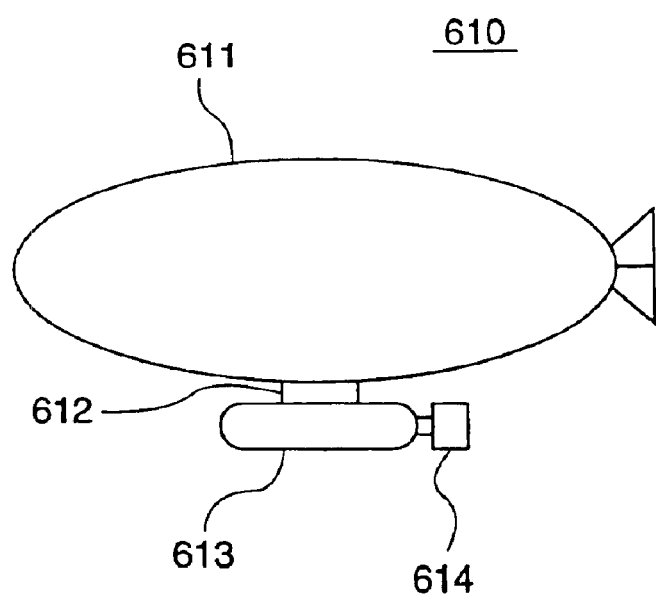
FIG. 24 is a schematic diagram showing the configuration of another airship.

Although not shown in FIG. 24, the airship 610 is equipped with the same propelling means as in the above-described embodiment, such as propeller fans. By releasing compressed air from the container 613 by causing the compressor 614 to perform a reverse operation instead of using the propelling means, the airship 610 can be moved or changed in posture by reaction from the released air.

[Airship 710]

Figure 25:
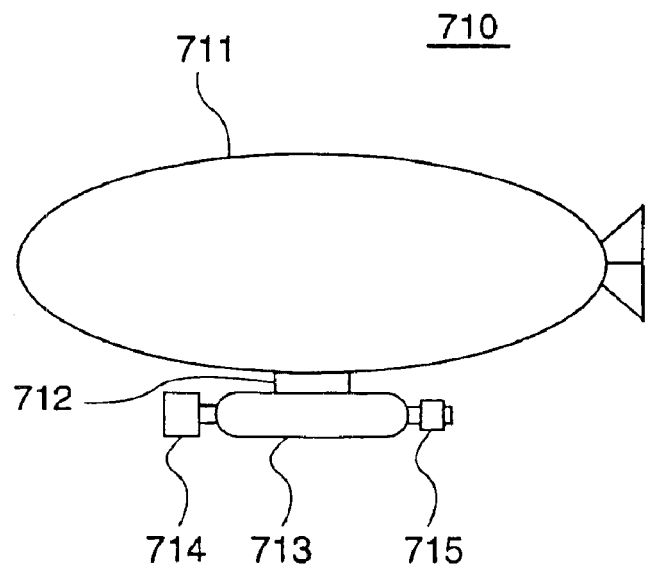
FIG. 25 is a schematic diagram showing the configuration of still another airship.

FIG. 25 shows a general configuration of an airship 710. Like the airship 610, the airship 710 is equipped with a ship main body 711, a control/management section 712, a container 713, and a compressor 714. In the airship 710, a control valve 715 is connected to the container 713. The control valve 715 can release compressed air from the container 715 and stop an outflow of air from the container 715. Using the control valve 715, the control/management section 712 can control the rate of release of air to the outside.

Although not shown in FIG. 25, the airship 710 is equipped with the same propelling means as in the above-described embodiment, such as propeller fans. By releasing compressed air from the container 713 through the control valve 715 instead of using the propelling means, the airship 710 can be moved or changed in posture by reaction from the released air. In this case, it is preferable that the control valve 715 be so configured as to be able to control the rate and direction of an outflow of air.

[Airship 810]

Figure 26:
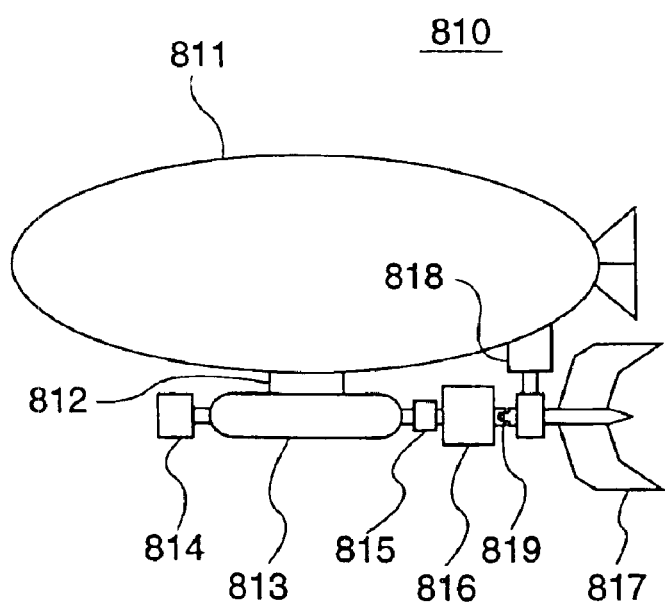
FIG. 26 is a schematic diagram showing the configuration of yet another airship.

FIG. 26 shows a general configuration of an airship 810. Like the airship 710, the airship 810 is equipped with a ship main body 811, a control/management section 812, a container 813, a compressor 814, and a control valve 815. The airship 810 is also equipped with a turbine 816 that is connected to the control valve 815 and a propeller fan 817 that is connected to the output shaft of the turbine 816. The shaft of the propeller fan 817 is rotatably supported by a support 818 that is attached to the ship main body 811, for example.

In the airship 810, if compressed air is released from the container 813 through the control valve 815, the turbine 816 is rotated to rotationally drive the propeller fan 817, to thereby propel the airship 810. The airship 810 may be configured in such a manner that the propeller fan 817 is connected to the turbine 816 through a universal coupling 819 and the support 818 can change the direction of the propeller fan 817. The traveling direction of the airship 810 can be changed by changing the direction of the propeller fan 817.

[Airship's Lifting Force Control Method]

Figure 27:
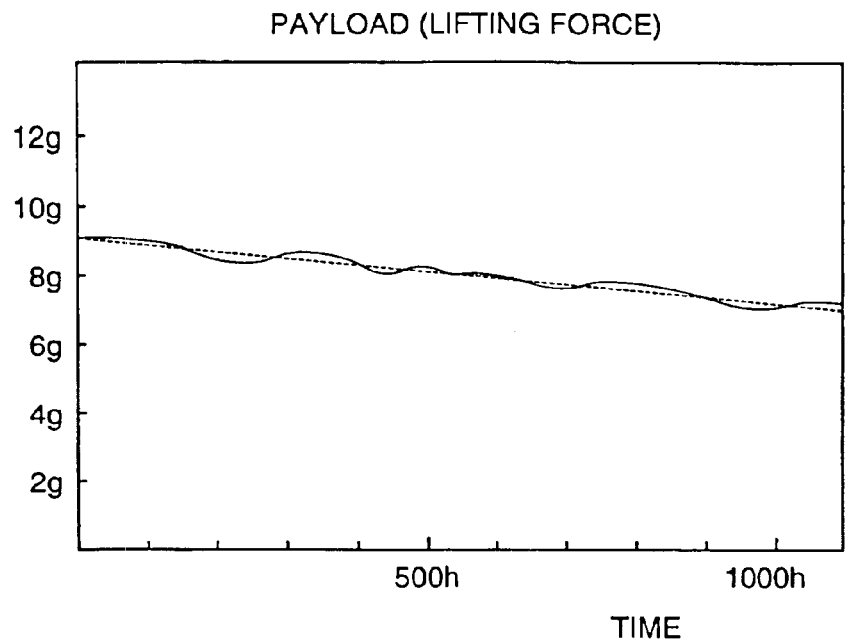
FIG. 27 is a graph showing a relationship between the payload and the time.

A lifting force control method of the above-described airships 610, 710, and 810 will be described below. FIG. 27 shows a relationship between the payload (maximum load mass) or lifting force and the elapsed time. As seen from this graph, the payload varies with time and there are two kinds of variation components: a variation with time component in which the payload decreases gradually with time and an environmental variation component in which the payload is varied by variations in environment. The variation with time component is caused by a phenomenon that the ship-floating gas continues to be lost as time elapses, and has a rate of about 1–2 g per 1,000 hours in the experiment of FIG. 27. On the other hand, the environmental variation component is due to variations in environment temperature, humidity, pressure, etc.

One method for controlling the lifting force of the airship is to release the compressed air in the container gradually so as to compensate for the variation with time(natural decrease) component of the payload that is indicated by the broken line in FIG. 27. With this measure, by setting the air release rate of the control valve at a value corresponding to the natural decrease of the payload, the height of the airship can be kept almost constant though the airship goes up or down to some extent due to the environmental variation component. In this case, the gas to be released may be a gas other than air. For example, the airship may be mounted with a container that is filled with any of such gases as a nitrogen gas. The gas is gradually released from the container.

Figure 28:
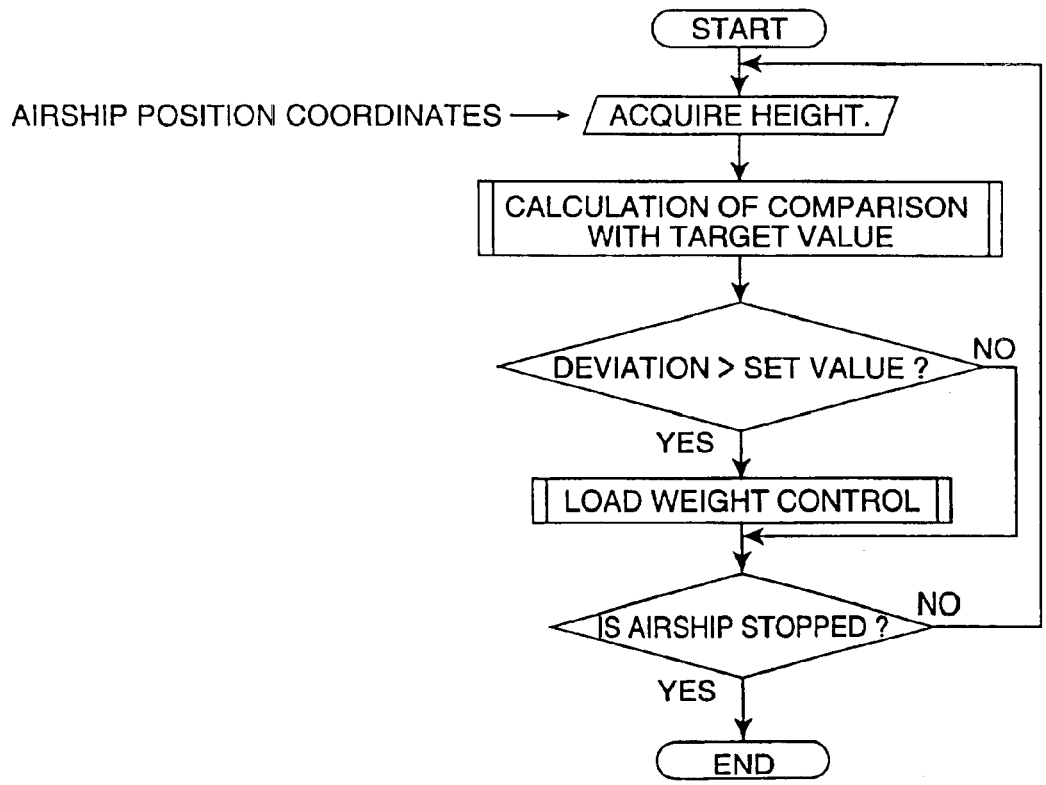
FIG. 28 is a schematic flowchart showing an airship height control method.

Alternatively, the weight of the airship may be controlled in a positive manner in accordance with the variation in the lifting force of the airship. FIG. 28 is a schematic flowchart showing a procedure of such a control method. When an airship position measurement is performed in the same manner as in the above-described embodiment, a height of the airship is obtained. Every time a position measurement is performed, a height of the airship is acquired from measurement data and a height deviation from a prescribed target value is calculated. If the height deviation is greater than a predetermined set value, the height is corrected by controlling the load weight of the airship by using the compressor, the control valve, etc. If the height deviation is smaller than the set value, no action is taken. In controlling the load weight of the airship, a differential or integral value of deviations may be taken into consideration. The target value of the height control is varied in accordance with the target value of the airship position control. The height control is performed all the time during a flight and is not performed while the airship is stopped.

In each of the above-described airships, the load weight of the airship is controlled by the means that is entirely independent of the ship main body (balloon). Therefore, the ship main body need not have a complex structure such as a double balloon, and hence the manufacturing cost can be reduced.

Figure 29:
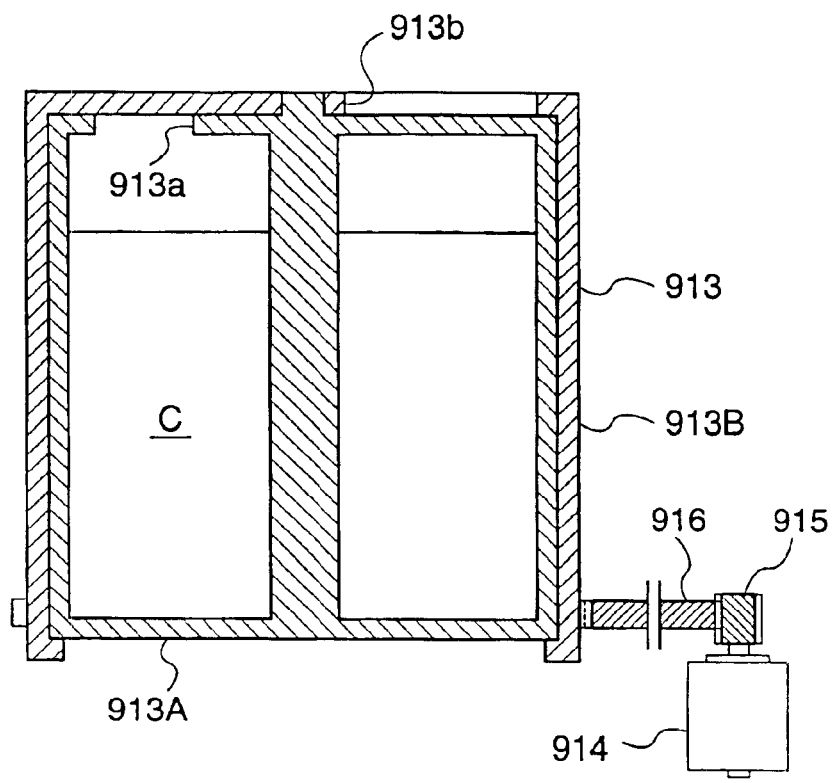
FIG. 29 is a schematic vertical sectional view showing the structure of a device to be mounted on the airship and having a container.
Figure 30:
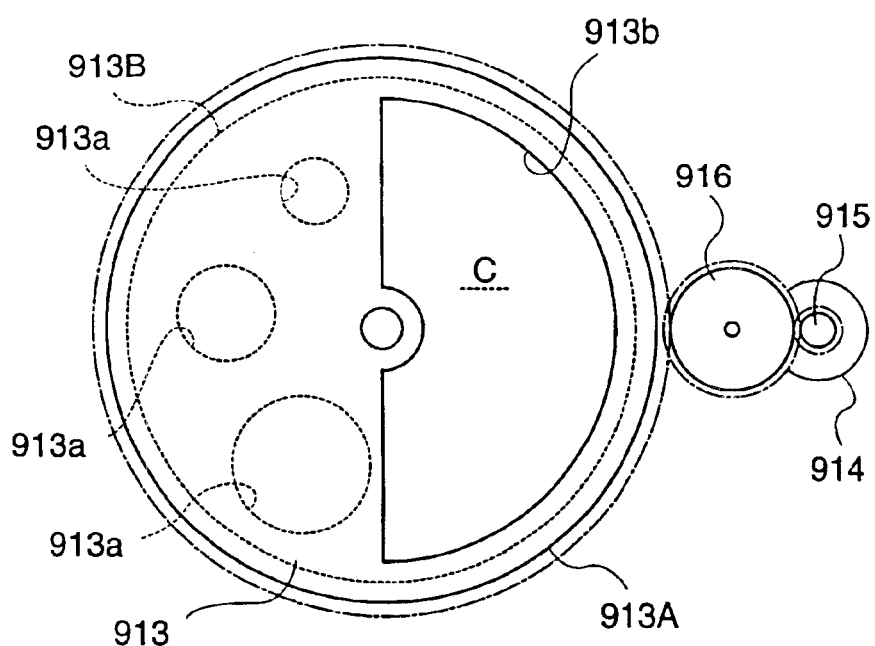
FIG. 30 is a plan view of the device of FIG. 29.

FIGS. 29 and 30 show a device that is mounted on each of the above-described airships to compensate for the natural decrease of the payload that is shown in FIG. 27. The device is equipped with a container 913 and a driving mechanism including a motor 914, a pulley 915, and a transmission gear 916. The container 913 is equipped with an internal container 913A that have contents C and a lid 913B that is rotatably attached to the internal container 913A so as to surround it. The top portion of the internal container 913A is formed with an opening 913a, which can be opened or closed by rotating the lid 913B with the driving mechanism. More specifically, the container 913 is opened if an opening 913b of the lid 913B overlaps with the opening 913a of the internal container 913A. The opening area can be varied by the degree of overlap between the openings 913a and 913b. The container 913 is closed if the openings 913a and 913b have no overlap.

The contents C of the container 913 is a liquid or a solid. Liquids that can evaporate easily such as water and alcohol are usable, and solids that can sublimate easily such as naphthalene, p-dichlorobenzene, peppermint, and camphor are usable. The evaporation or sublimation rate of the contents C can be controlled by adjusting the opening area of the container 913.

The airship can be configured in such a manner that when mounted on the airship the above device can compensate for a natural variation (i.e., variation with time) of the payload. In this case, the rate of decrease of the load weight can be controlled by adjusting the opening area of the container 913 with control on the driving mechanism. The opening area of the container 913 may be adjusted manually instead of using the driving mechanism.

The container 913 whose opening area is adjustable in the above manner can also be mounted on each of the airships shown in FIGS. 24–26. In this case, the load of the compressor can be reduced and hence the compressor can be made smaller or lighter.

[Configurations for Forming Various Systems]

Figure 31:
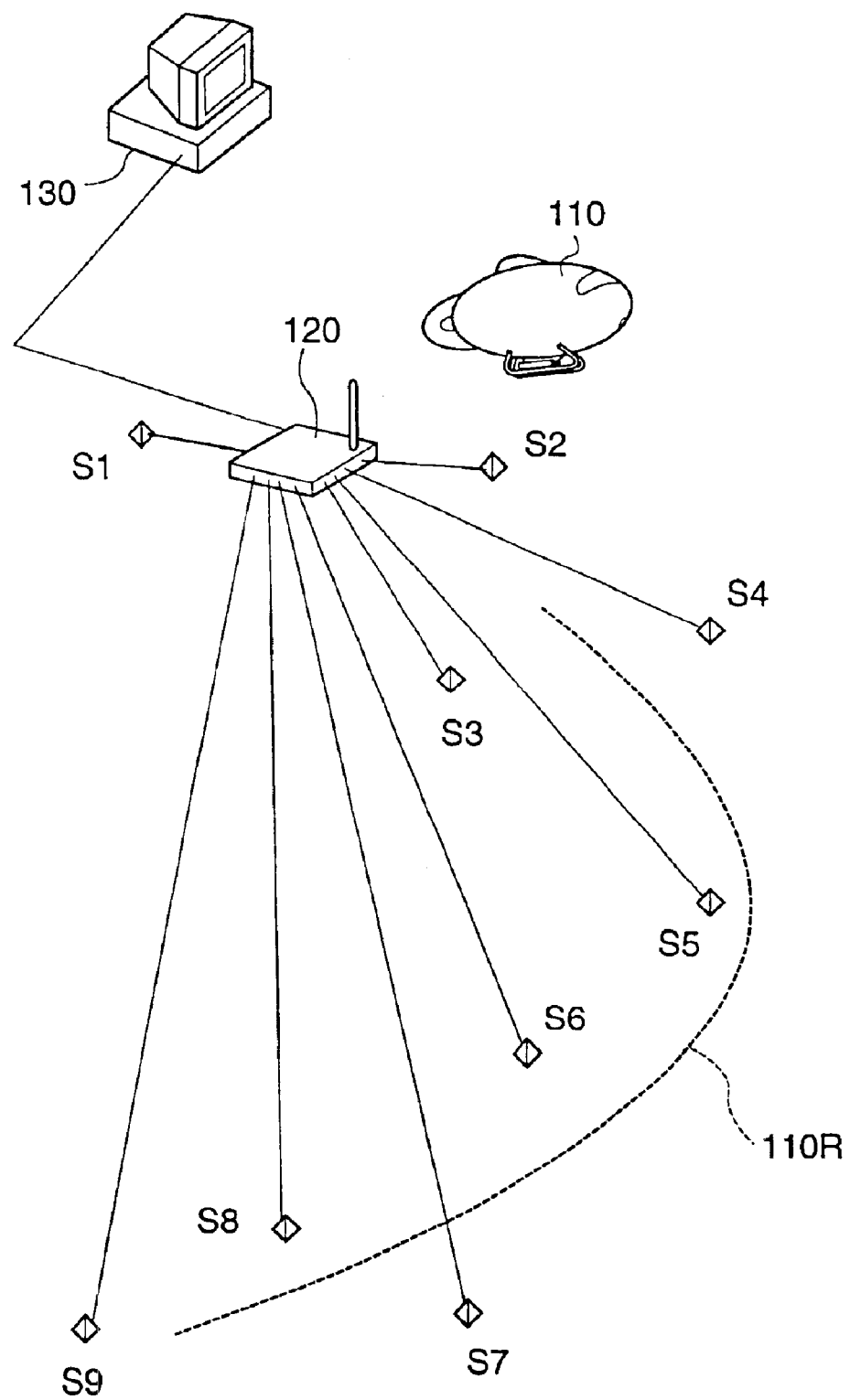
FIG. 31 is a schematic perspective view showing a configuration that is suitable for construction of various systems using any of the above airship systems.

FIG. 31 is a schematic perspective view showing a basic configuration to be employed in constructing various systems using any of the above airship systems. This configuration is equipped, in addition to the same airship 110 and base station 120 as used in the airship system 100, with a computer 130 that is connected to the base station 120. In this case, by distributing a lot of measurement point units S1–S9 in an airship flight area using the above techniques, the ultrasonic wave output power can be reduced in each distance measuring operation and interference between ultrasonic waves can be prevented.

Figure 32:
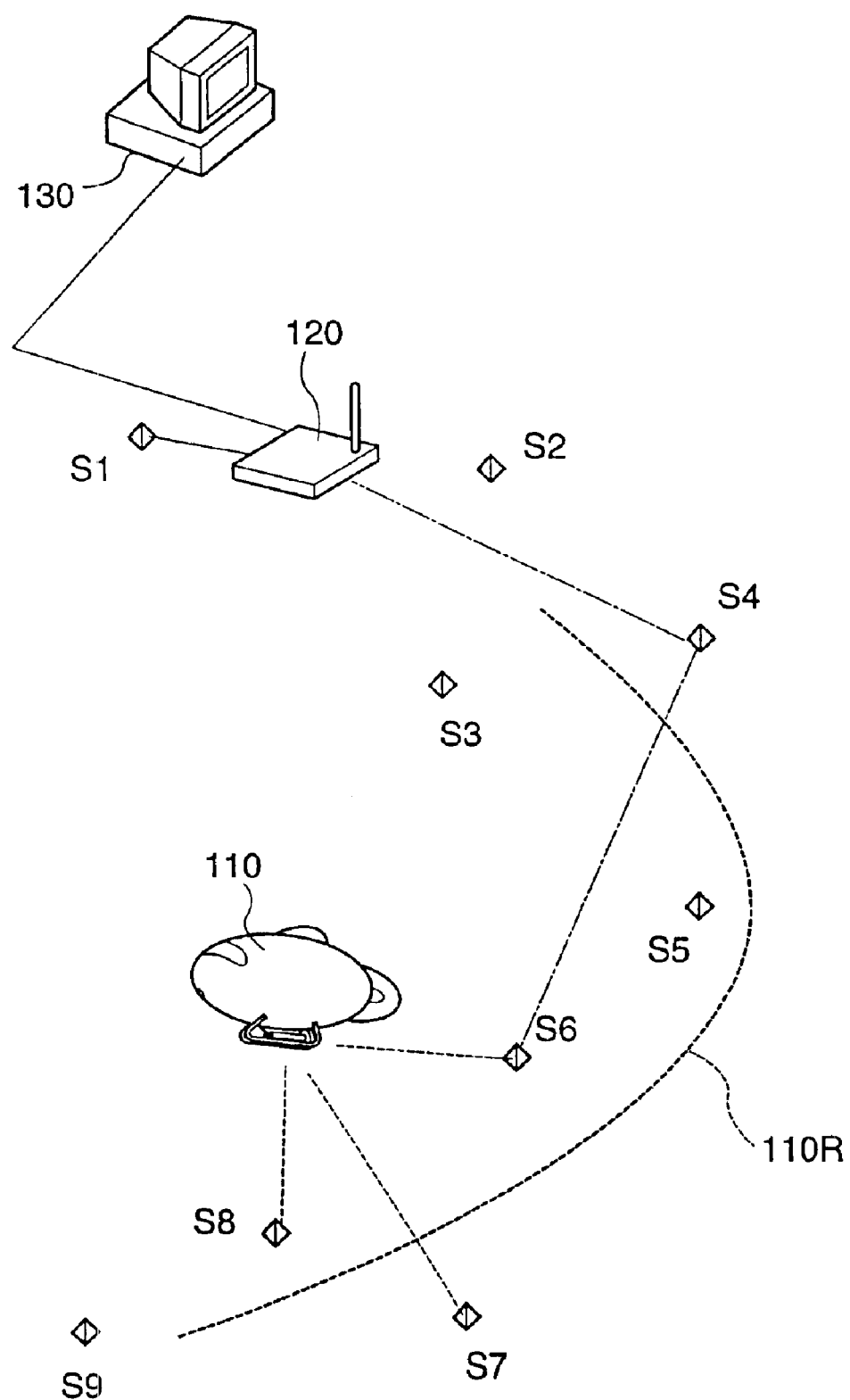
FIG. 32 is a schematic perspective view showing another configuration using any of the above airship systems.

FIG. 32 shows a configuration in which data exchange between the base station 120 and each of the measurement point units S1–S9 is performed by radio communication. In this case, the system operates in entirely the same manner as in the above case where data are exchanged by wired communication. That is, communication is performed between the airship 110 and the base station 120 and distance measurement is performed on the distances between the airship 110 and three of the measurement point units S1–S9.

However, this configuration has, in addition to the function of the above configuration, a function of performing communication between the airship 110 and the base station 120 via one or a plurality of measurement point units (i.e., measurement point units serve as relay points). For example, if the airship 110 and the base station 120 cannot directly communicate with other because the airship 110 is too far from the base station 120 or an obstacle exists between the airship 110 and the base station 120, communication is performed via one or a plurality of measurement point units (in the example of FIG. 32, measurement point units S4 and S6) that are located between the airship 110 and the base station 120 as indicated by chain lines in FIG. 32. This allows the airship 110 to fly far away from the base station 120. This also allows the system to be used in various environments because the airship 110 can fly irrespective of whether obstacles exist. In addition, control on the airship 110 can be made stable even at a place of a bad radio environment. By employing a process for searching for a communicable route, a communication route between the airship 110 and the base station 120 via one or a plurality of measurement point units as relay points can be determined in accordance with a situation. For example, a communicable route can be found on a trial-and-error basis by performing test communications before a regular communication for data exchange.

As described above, communication between the airship 110 and the base station 120 using measurement point units as relay points may be performed either by radio or by wire, using either radio waves or sound waves, or using either infrared light or radio waves. Further, such communication may be performed according to an arbitrary scheme by using any communication protocol. For example, radio communication and wired communication may be performed between the airship 110 and the measurement point units and between the measurement point units and the base station 120, respectively.

A plurality of base stations 120 can be provided in the system, and a plurality of airships 110 can be controlled irrespective of whether the number of base stations 120 is unity or plural. In particular, the use of the computer 130 makes it possible to control the entire system in a unified manner while controlling a plurality of base stations 120 or a plurality of airships 110 so that they are related to each other in an organic manner.

(Guidance System)

The computer system 130 has a function of compensating for the base station 120's function of controlling the airship 110. For example, the system can be so configured that a route to be taken by the airship 110 can be selected from a plurality of route patterns by manipulating the computer 130. This makes it possible to construct a guidance system that uses the airship 110 as a guide by asking a user a destination and performing a manipulation corresponding to the destination on the computer 130.

Figure 33:
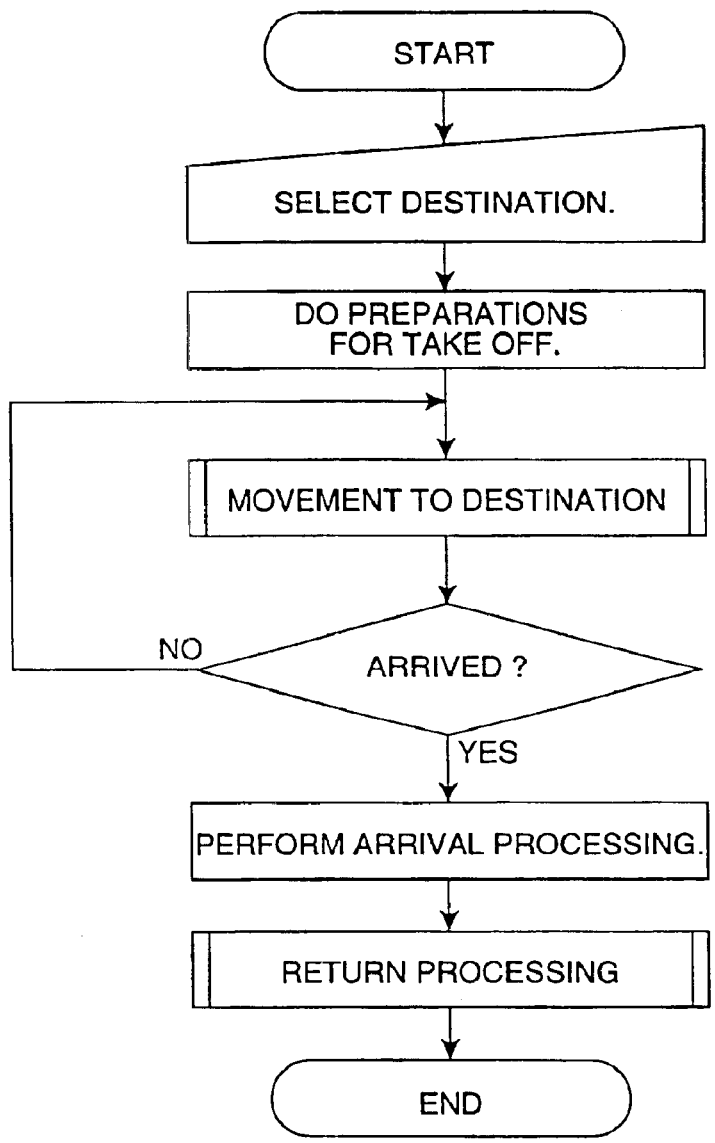
FIG. 33 is a schematic flowchart showing a process to be executed by a guidance system.

In this guidance system, for example, as shown in FIG. 33, the computer 130 selects a destination in accordance with an input through a proper input means (e.g., a keyboard, manipulation switches, or various sensors such as a camera). Where a plurality of routes are available for the destination, the computer 130 selects one from those routes.

Then, preparatory operations such as a check as to whether a usable airship 110 exists and informing a user of a start of guidance using visual information (e.g., a display on the screen of a monitor or the like that is connected to the computer 130 or blinking of LED mounted on the airship 110) or a voice (e.g., verbal guidance that is output from a speaker or the like that is mounted on the airship 110).

Then, the airship 110 takes off to start guidance for the user and moves toward the destination. At this time, it is preferable to inform, in the same manner as in the preparatory operations, the user that the guidance is being performed. Then, it is checked whether the airship 110 has reached the destination by comparing, with position coordinates of the destination (stored in advance), position coordinates of the airship 110 that are measured by the above-described method. If the airship 110 has not reached the destination yet, the movement of the airship 110 is continued. If the airship 110 has reached the destination, the airship 110 is stopped at the destination (arrival processing). Alternatively, to notify the user of the arrival at the destination, the airship 110 may be caused to perform a special action such as circling around in the vicinity of the destination. The user may be notified of the arrival at the destination by light (an image) or a sound (voice).

Then, to return the airship 110 to the base station 120, return processing is performed in which the airship 110 is caused to fly along a prescribed route.

This guidance system is effective when used in an exhibition hall, a hotel, a theme park, a conference site, or the like. To construct this guidance system, the measurement point units S1–S9 are arranged along a guidance route 110R. Where there exist a plurality of guidance routes from which selection can be made, it is necessary to arrange measurement point units for every guidance route.

(Monitoring System)

A monitoring system using the airship 110 can be constructed by mounting a camera, a microphone, etc. on the airship 110 and causing the airship 110 to go along a prescribed monitoring route 110R repeatedly. In this monitoring system, the computer 130 can record image and sound information detected by the camera and the microphone. The computer 130, for example, may incorporate a monitoring program for alarming or reporting based on such an image or sound. The monitoring program includes a flight pattern to be used for causing the airship 110 to fly along the prescribed monitoring route. In the case of a system for monitoring movable objects such as babies or children, the system may be provided with an alarm or reporting function (e.g., a function of issuing an alarm or a report when an object of monitoring has moved out of a predetermined range) or a function of following an object of monitoring.

Figure 34:
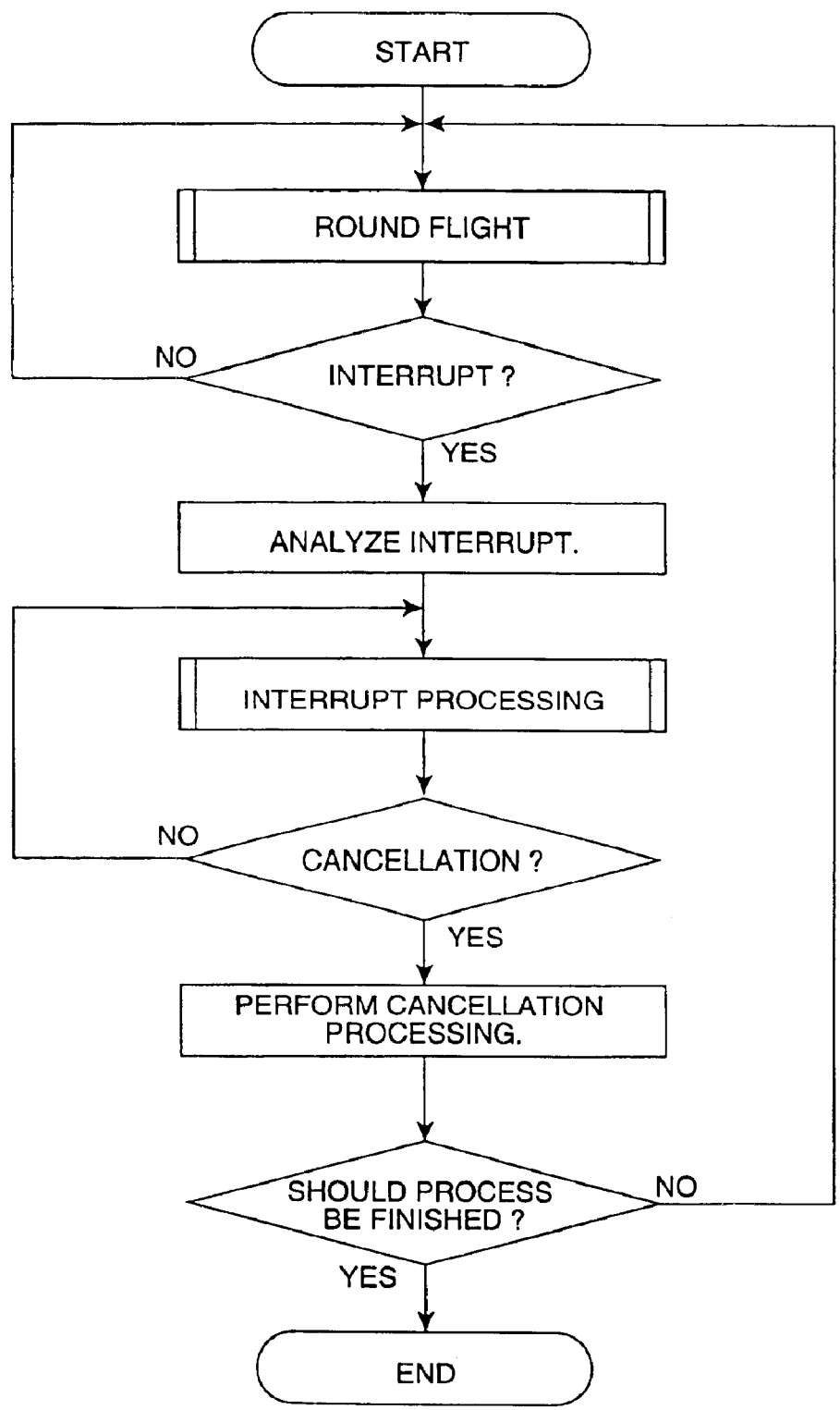
FIG. 34 is a schematic flowchart showing a process to be executed by a monitoring system.

FIG. 34 outlines a process to be executed by the above monitoring system. It is assumed that in this monitoring system a basic operation that the airship 110 goes along a predetermined route is performed all the time and that during a round flight a visual information input means such as a camera and an audio information input means such as a microphone that are mounted on the airship 110 send acquired information to the base station 120 or the computer 130 all the time or regularly by communication. To reduce the amount of transmission data and the power consumption for data transmission, it is preferable that data be collected and sent intermittently.

This monitoring system is configured in such a manner that interrupt processing is performed when an abnormality has been found by the visual information input means or the audio information input means. For example, if a moving object or an object that is larger in luminous intensity or luminance than a predetermined value is found in an image, it is judged as an abnormality in visual information of the visual information input means. A difference from expected image data that is stored in advance may be judged as an abnormality. Examples of abnormalities in audio information of the audio information input means are a sound that is larger in volume than a predetermined value, a sound having a particular pattern such as a sound of a break of glass, a sound that does not coincide with expected patterns that are stored in advance. It is preferable that the computer 130 perform the abnormality analysis.

If an abnormality as mentioned above is found in a round flight, an interrupt signal (trigger) that is preset for a corresponding one of abnormality forms is generated, whereupon the content of the interrupt is analyzed. In the interrupt analysis, interrupt processing is selected in accordance with the kind of the interrupt signal. If the kind of abnormality cannot be determined only from the interrupt signal, a further analysis may be made based on visual information detected by the visual information input means and audio information detected by the audio information input means to analyze the kind of the abnormality.

Then, interrupt processing that has been determined by the interrupt analysis is performed. The interrupt processing includes announcement processing such as a display on the screen of the monitor to the effect that an abnormality has occurred, issuance of an alarm to the user over a network, or generation of an alarm sound. When the airship 110 is sending data intermittently, switching is made to continuous transmission. Such processing as converting data transmitted from the airship 110 into long-term-storage data by associating the data with a flag is also performed. Ordinary data (without a flag) transmitted from the airship 110 is deleted automatically after a lapse of a predetermined time.

In the interrupt processing, control is so made that a preset operation such as a stop or circling of the airship 110 is performed when an abnormality is found. Control may be so made that if a moving object is found in an image or an abnormal sound occurs, such an operation as moving the airship 110 to a place where the moving object has been found or the abnormal sound has occurred and circling the airship 110 in the vicinity of the object or place or stopping the airship 110 with the sensors directed to the object or place is performed. Control may be so made that if a moving object is found the airship 110 follows the object. It is preferable that the computer 130 perform processing for following an object, because it requires high-level processing (image processing and speech processing).

Then, the interrupt state is canceled by the user's manipulating the computer 130 or after a lapse of a predetermined time. As cancellation processing, the control of the interrupt processing on the airship 110 is cancelled and the airship 110 is returned to an ordinary round flight. The airship 110 continues the round flight until an end manipulation is performed externally or the round flight program finishes.

The guidance system shown in FIG. 33 and the monitoring system shown in FIG. 34 can be used as a kind of advertisement medium by setting an advertisement route instead of a destination and a guidance route or mounting the airship 110 with output devices such as a display and a speaker instead of the sensors such as a camera and a microphone serving as the monitoring means. In this case, for example, it is possible to add, as an operation program that is installed in the computer 130, a function of causing the airship 110 to fly along a prescribed advertisement route 110R, and a function of causing the airship 110 to automatically move to a place that is crowded with people and stay there.

(Toy System)

By using any of the above airship systems, a toy system can also be constructed in which the airship is used as a robot toy that reacts to an action of a person. For example, a function of making a move in response to words such as an instruction of a person or a function of replying to words of a person by analyzing a voice that is detected by a microphone (speech recognition) can be added. A function of causing the airship to move or output a sound in response to motion of a person by analyzing an image obtained by a camera (image recognition) can also be added.

Figure 35:
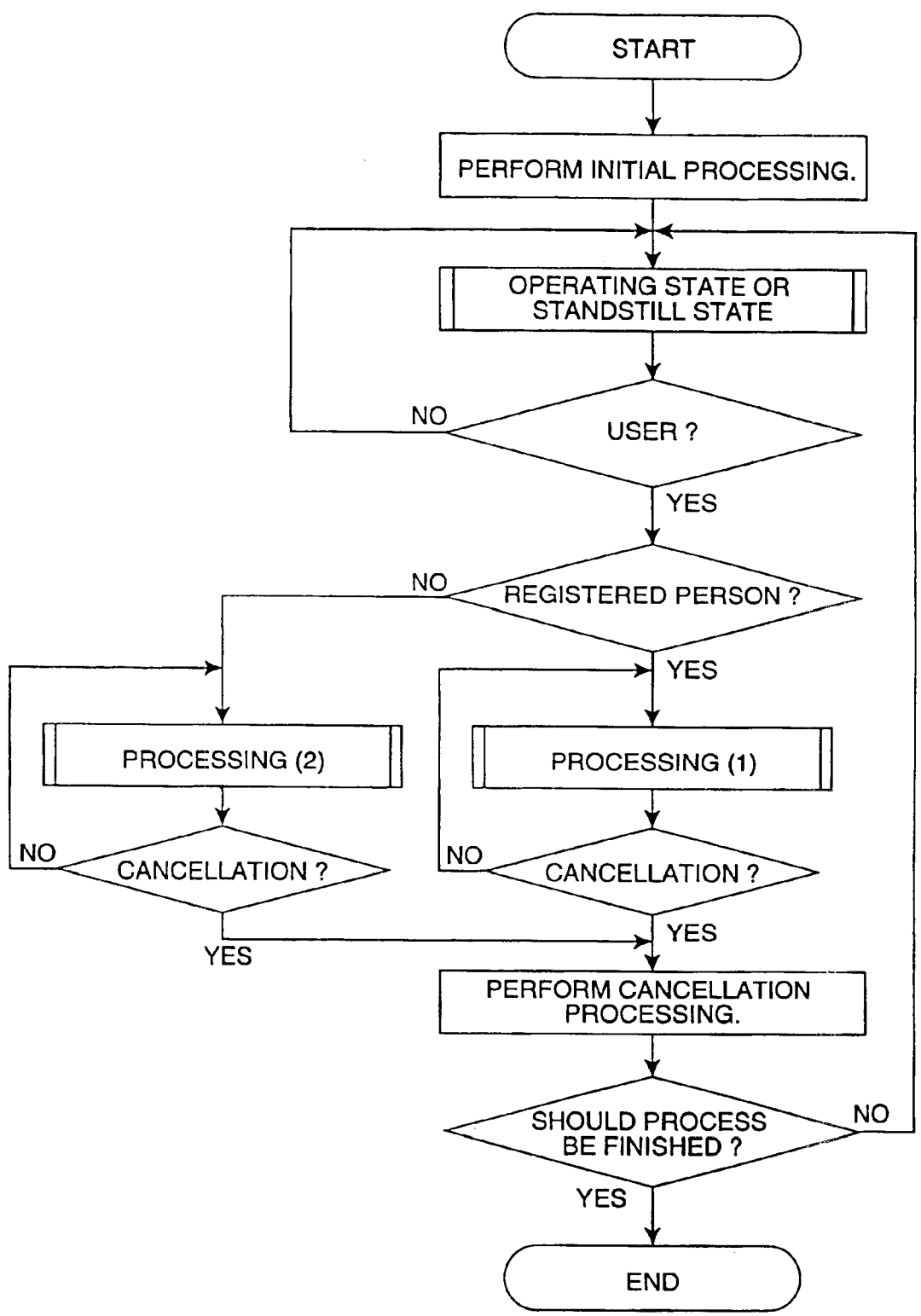
FIG. 35 is a schematic flowchart showing a process to be executed by a toy system.

FIG. 35 outlines a process to be executed by a toy system. This toy system is such that if a user speaks to the airship 110, the airship approaches the user and converses with him or her or follows or escapes from him or her. The airship 110 discriminates registered users from unregistered users and reacts differently for the two kinds of users.

First, the airship 110 performs initial processing such as storing a current state that will be used in returning from interrupt processing (described later), position information of the airship 110, and other information. Then, a transition is made to a standby operation such as a standstill state or an operating state, such as a round flight along a predetermined route or circling. If a user is found in this state by a camera, a microphone, or the like that is mounted on the airship 110, it is judged, by image recognition or speech recognition, whether the user is a registered person. For example, the face of the user is collated by image recognition or a voiceprint of the user is collated by speech recognition. The system may be configured in such a manner that the user is recognized and whether he or she is a registered person is judged based on preset words (e.g., the name of the airship 110) spoken by the user.

Then, processing (1) is executed if the user is a registered person and processing (2) is executed if he or she is not. In the processing (1), control is so made that the airship 110 makes an specific action that is set for the registered person such as outputting his or her name that is stored or a specific greeting that is set for the registered person. As for the processing (2), control may be so made that the airship 110 makes a preset, general action such as outputting a general call or greeting. In addition to general functions that can be used even by unregistered persons, a special function that can be used only under the right of registered persons may be provided as a function of causing the airship 110 to react. The special function may have a plurality of stages corresponding to respective kinds of registered persons. Examples of the general functions are simple functions of returning a greeting and responding to an inquiry of present time. Examples of the special functions are a function of making a phone call by instructing the airship 110 by voice (e.g., a function of communicating with an external system via the computer 130 and a network to which the computer 130 is connected) and a function of remote-controlling any of various kinds of equipment by instructing the airship 110 by voice.

Then, cancellation processing is performed if, for example, a cancellation manipulation (e.g., a manipulation on a switch that is provided on the airship 110) is performed by the user, a preset word (e.g., "end") corresponding to cancellation is detected, a predetermined time has elapsed, or no verbal instruction is input for a prescribed time. As a result, the airship 110 returns to a standstill state or an operating state as standby operation based on the data stored in the initial processing. The above operations continue until an end manipulation is performed externally or the operation program finishes.

Where each of various systems such as the above guidance system, monitoring system, advertisement system, and toy system is constructed, it is preferable that the computer 130 perform high-level, complex processing such as image recognition and speech recognition and the airship 110 and the base station 120 be used as terminals that are connected to the computer 130. This particularly makes it possible to reduce the power consumption and the weight of the airship 110. However, in the invention, all or part of the above various kinds of processing may be performed by the airship 110 or the base station 120 rather than the computer 130.

The above-described embodiments do not restrict the scope of the invention at all and the following configurations may be employed irrespective of whether they are described in the embodiments.

It is possible to mount the airship with various sensors such as an imaging device that detects light and an image and corresponds to the human eyes, a sound recording device such as a microphone for detecting a voice or a sound, and an odor sensor for sensing an odor in addition to the above-mentioned obstacle detecting sensor. Mounting the airship 110, for example, with those sensors makes it possible to cause the airship 110 to perform a prescribed operation by giving it light, a sound, an odor, or the like.

The airship may be equipped with any of various propelling means other than the above-mentioned propeller fans, such as a propeller, an ion engine, a gas cylinder, and a pump. To make the traveling direction controllable, a driving mechanism for changing the direction of the propelling means itself to change the acting direction of the propelling means such as the propelling fans, an air current control plate for changing the direction of an air current, or a like means may be provided. To change the traveling direction of the airship in the vertical direction, ballast, a small gas cylinder, or the like may be used instead of the above-described method in which the gas compressing/releasing means or evaporation/sublimation is used.

The obstacle avoiding operation may be activated after the airship contacts an obstacle, that is, after detection of impact or acceleration.

The airship may be mounted with a light-emitting device for generating light, a speaker for generating a sound, or a like device. For example, the airship may be so configured as to illuminate a particular location or a place that depends on a flight position or to emit light or give a greeting if a person comes close to the airship.

Another sensor may be attached to the airship so that a flight of the airship can be controlled by sending an instruction to the airship from a remote controlling means such as a remote controller. In this case, the system may be configured in such a manner that a control signal received by the airship is transferred to the base station and the base station thereafter sends various instructions such as a flight instruction to the airship.

INDUSTRIAL APPLICABILITY

As described above, according to the invention, the weight and the power consumption of an airship can be reduced. For example, this makes it possible to reduce the size of an airship and cause it to fly indoors. Therefore, the invention makes it possible to construct various practical systems.

What is claimed is:

1. An aircraft system comprising:
    an aircraft having communication means and propelling means that operates according to instructions that are given;
    a base station having control means and communication means capable of communicating with the aircraft; and
    earth-based position measuring means for measuring a position of the aircraft, wherein:
    the control means includes instruction forming means for forming the instructions including a flight instruction for controlling a route of the aircraft based on the position of the aircraft that is measured by the position measuring means, and causes the communication means to send the instructions to the aircraft;
    the position measuring means includes distance measuring means for measuring distances between the aircraft and a plurality of measurement points to determine positional relationships between the aircraft and the measurement points;

the distance measuring means includes at least one ultrasonic wave generator provided at least at one of the aircraft and the measurement points for generating ultrasonic waves and at least one ultrasonic wave detector provided at least at one of the aircraft and the measurement points for detecting the ultrasonic waves emitted from the at least one wave generator, and calculates distances between the aircraft and the measurement points based on times from generation of the ultrasonic waves by the at least one ultrasonic wave generator to arrival of the ultrasonic waves at the at least one wave detector; and the aircraft includes obstacle detecting means for detecting an obstacle located in a traveling direction of the aircraft, and the aircraft system further includes obstacle avoiding means for controlling the propelling means to change the route of the aircraft to avoid an obstacle upon the obstacle detecting means detecting the obstacle.

2. The aircraft system according to claim 1, wherein the measurement points are located at least at three locations.

3. The aircraft system according to claim 2, wherein the position measuring means determines a position of the aircraft by measuring distances between the aircraft and three measurement points with the distance measuring means.

4. The aircraft system according to claim 1, further comprising measurement point positional relationship determining means for determining positional relationships between the measurement points.

5. The aircraft system according to claim 4, wherein the measurement point positional relationship determining means measures distances between the measurement points.

6. The aircraft system according to claim 5, wherein the measurement point positional relationship determining means comprises ultrasonic wave generators that are provided at least at two of the three measurement points and an ultrasonic wave detector provided at another measurement point for detecting ultrasonic waves emitted from the ultrasonic wave generators, and calculates distances between the measurement points based on times from emission of ultrasonic waves from the ultrasonic wave generators to arrival of the ultrasonic waves at the ultrasonic wave detector.

7. The aircraft system according to claim 1, further comprising additional measurement point position determining means for determining positional relationships between an additional measurement point and the measurement points.

8. The aircraft system according to claim 7, wherein the additional measurement point position determining means measures distances between the additional measurement point and the measurement points.

9. The aircraft system according to claim 1, further comprising route changing means for reversibly tracking a traveled route when the position measuring means becomes unable to measure a position of the aircraft.

10. The aircraft system according to claim 1, further comprising route correcting means for correcting the route of the aircraft before the aircraft goes out of a position-measurable area where aircraft position measurement by the position measuring means is possible.

11. The aircraft system according to claim 1, wherein the obstacle avoiding means is provided at the aircraft.

12. The aircraft system according to claim 1, wherein the obstacle avoiding means is provided at the base station, the obstacle detecting means sends an obstacle detection signal to the base station when detecting the obstacle, and the obstacle avoiding means causes the instruction forming means to form a flight instruction for changing the route of the aircraft to avoid the obstacle based on the obstacle detection signal.

13. The aircraft system according to claim 1, further comprising a charging base for supplying power to the aircraft.

14. The aircraft system according to claim 13, wherein the aircraft is configured to send a return request signal to the base station when power has run low, and upon receiving the return request signal, the control means forms a return instruction and sends the return instruction to the aircraft, and the propelling means operates to return the aircraft to the charging base.

15. The aircraft system according to claim 1 wherein the aircraft system is configured to fly the aircraft according to a prescribed flight program.

16. The aircraft system according to claim 1, wherein communication means for communicating with the base station is provided at least at one measurement point, and communication between the aircraft and the base station is performed via the communication means.

17. A guidance system comprising:
   an aircraft having communication means and propelling means that operates according to instructions that are given;
   a base station having control means and communication means capable of communicating with the aircraft;
   earth-based position measuring means for measuring a position of the aircraft; and
   means for moving the aircraft along a prescribed guidance route, wherein:
   the control means includes instruction forming means for forming the instructions including a flight instruction for controlling a route of the aircraft based on the position of the aircraft that is measured by the position measuring means, and causes the communication means to send the instructions to the aircraft;
   the position measuring means includes distance measuring means for measuring distances between the aircraft and a plurality of measurement points to determine positional relationships between the aircraft and the measurement points;
   the distance measuring means includes at least one ultrasonic wave generator provided at least at one of the aircraft and the measurement points for generating ultrasonic waves and at least one ultrasonic wave detector provided at least at one of the aircraft and the measurement points for detecting the ultrasonic waves emitted from the at least one wave generator, and calculates distances between the aircraft and the measurement points based on times from generation of the ultrasonic waves by the at least one ultrasonic wave generator to arrival of the ultrasonic waves at the at least one wave detector; and
   the aircraft includes obstacle detecting means for detecting an obstacle located in a traveling direction of the aircraft, and the aircraft system further includes obstacle avoiding means for controlling the propelling means to change the route of the aircraft to avoid an obstacle upon the obstacle detecting means detecting the obstacle.

18. A monitoring system comprising:
   an aircraft having communication means and propelling means that operates according to instructions that are given, and monitoring means;

a base station having control means and communication means capable of communicating with the aircraft;

earth-based position measuring means for measuring a position of the aircraft; and means for moving the aircraft along a prescribed monitoring route, wherein:

the control means includes instruction forming means for forming the instructions including a flight instruction for controlling a route of the aircraft based on the position of the aircraft measured by the position measuring means, and causes the communication means to send the instructions to the aircraft;

the position measuring means includes distance measuring means for measuring distances between the aircraft and a plurality of measurement points to determine positional relationships between the aircraft and the measurement points;

the distance measuring means includes at least one ultrasonic wave generator provided at least at one of the aircraft and the measurement points for generating ultrasonic waves and at least one ultrasonic wave detector provided at least at one of the aircraft and the measurement points for detecting the ultrasonic waves emitted from the at least one wave generator, and calculates distances between the aircraft and the measurement points based on times from generation of the ultrasonic waves by the at least one ultrasonic wave generator to arrival of the ultrasonic waves at the at least one wave detector; and the aircraft includes obstacle detecting means for detecting an obstacle located in a traveling direction of the aircraft, and the aircraft system further includes obstacle avoiding means for controlling the propelling means to change the route of the aircraft to avoid an obstacle upon the obstacle detecting means detecting the obstacle.

19. A monitoring system comprising:

an aircraft having communication means, propelling means that operates according to instructions that are given, and monitoring means;

a base station having control means and communication means capable of communicating with the aircraft;

earth-based position measuring means for measuring a position of the aircraft; and means for causing the aircraft to follow a prescribed monitoring object, wherein:

the control means includes instruction forming means for forming the instructions including a flight instruction for controlling a route of the aircraft based on the position of the aircraft that is measured by the position measuring means, and causes the communication means to send the instructions to the aircraft;

the position measuring means includes distance measuring means for measuring distances between the aircraft and a plurality of measurement points to determine positional relationships between the aircraft and the measurement points;

the distance measuring means includes at least one ultrasonic wave generator provided at least at one of the aircraft and the measurement points for generating ultrasonic waves and at least one ultrasonic wave detector provided at least at one of the aircraft and the measurement points for detecting the ultrasonic waves emitted from the at least one wave generator, and calculates distances between the aircraft and the measurement points based on times from generation of the ultrasonic waves by the at least one ultrasonic wave generator to arrival of the ultrasonic waves at the at least one wave detector; and the aircraft includes obstacle detecting means for detecting an obstacle located in a traveling direction of the aircraft, and the aircraft system further includes obstacle avoiding means for controlling the propelling means to change the route of the aircraft to avoid an obstacle upon the obstacle detecting means detecting the obstacle.

20. The monitoring system according to claim 19, further comprising reporting means for reporting a monitoring state of the monitoring means.

21. An advertisement system comprising:

an aircraft having communication means, propelling means that operates according to instructions that are given, and one of sound output means and display means;

a base station having control means and communication means capable of communicating with the aircraft;

earth-based position measuring means for measuring a position of the aircraft; and means for moving the aircraft along a prescribed advertisement route, wherein:

the control means includes instruction forming means for forming the instructions including a flight instruction for controlling a route of the aircraft based on the position of the aircraft that is measured by the position measuring means, and causes the communication means to send the instructions to the aircraft;

the position measuring means includes distance measuring means for measuring distances between the aircraft and a plurality of measurement points to determine positional relationships between the aircraft and the measurement points;

the distance measuring means includes at least one ultrasonic wave generator provided at least at one of the aircraft and the measurement points for generating ultrasonic waves and at least one ultrasonic wave detector provided at least at one of the aircraft and the measurement points for detecting the ultrasonic waves emitted from the at least one wave generator, and calculates distances between the aircraft and the measurement points based on times from generation of the ultrasonic waves by the at least one ultrasonic wave generator to arrival of the ultrasonic waves at the at least one wave detector;

the aircraft includes obstacle detecting means for detecting an obstacle located in a traveling direction of the aircraft, and the aircraft system further includes obstacle avoiding means for controlling the propelling means to change the route of the aircraft to avoid an obstacle upon the obstacle detecting means detecting the obstacle.

22. A robot toy system comprising:

an aircraft having communication means, propelling means that operates according to instructions that are given, detecting means, and output means;

a base station having control means and communication means capable of communicating with the aircraft;

earth-based position measuring means for measuring a position of the aircraft; and means for causing the output means to operate in accordance with movement of an object that can be detected by the detecting means, wherein:

the control means includes instruction forming means for forming the instructions including a flight instruction for controlling a route of the aircraft based on the position of the aircraft that is measured by the position measuring means, and causes the communication means to send the instructions to the aircraft;

the position measuring means includes distance measuring means for measuring distances between the aircraft and a plurality of measurement points to determine positional relationships between the aircraft and the measurement points;

the distance measuring means includes at least one ultrasonic wave generator provided at least at one of the aircraft and the measurement points for generating ultrasonic waves and at least one ultrasonic wave detector provided at least at one of the aircraft and the measurement points for detecting the ultrasonic waves emitted from the at least one wave generator, and calculates distances between the aircraft and the measurement points based on times from generation of the ultrasonic waves by the at least one ultrasonic wave generator to arrival of the ultrasonic waves at the at least one wave detector; and the aircraft includes obstacle detecting means for detecting an obstacle located in a traveling direction of the aircraft, and the aircraft system further includes obstacle avoiding means for controlling the propelling means to change the route of the aircraft to avoid an obstacle upon the obstacle detecting means detecting the obstacle.

23. The system according to claim 22, wherein communication means for communicating with the base station is provided at least at one measurement point, and communication between the aircraft and the base station is performed via the communication means.

* * * * *